(12) United States Patent
Park et al.

(10) Patent No.: US 10,710,611 B2
(45) Date of Patent: Jul. 14, 2020

(54) VEHICLE CONTROL DEVICE MOUNTED ON VEHICLE AND METHOD FOR CONTROLLING THE VEHICLE

(71) Applicant: LG Electronics Inc., Seoul (KR)

(72) Inventors: Minjae Park, Seoul (KR); Minah Han, Seoul (KR); Kuznetsov Vassily, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 15/853,331

(22) Filed: Dec. 22, 2017

(65) Prior Publication Data

US 2019/0016346 A1 Jan. 17, 2019

(30) Foreign Application Priority Data

Jul. 14, 2017 (KR) ........................ 10-2017-0089807

(51) Int. Cl.
| | |
|---|---|
| *B60Q 9/00* | (2006.01) |
| *B60W 50/16* | (2020.01) |
| *B60W 50/10* | (2012.01) |
| *B60W 40/08* | (2012.01) |
| *B60W 40/105* | (2012.01) |
| *G08G 1/095* | (2006.01) |
| *G05D 1/00* | (2006.01) |
| *G08G 1/16* | (2006.01) |

(Continued)

(52) U.S. Cl.
CPC ............ *B60W 50/16* (2013.01); *B60W 40/08* (2013.01); *B60W 40/105* (2013.01); *B60W 50/10* (2013.01); *G05D 1/0088* (2013.01); *G08G 1/095* (2013.01); *G08G 1/165* (2013.01); *G08G 1/166* (2013.01); *B60W 2050/143* (2013.01); *B60W 2520/10* (2013.01); *B60W 2540/10* (2013.01); *B60W 2540/12* (2013.01); *B60W 2554/00* (2020.02); *G07C 5/008* (2013.01)

(58) Field of Classification Search
USPC ................................................ 701/538, 29.7
See application file for complete search history.

(56) References Cited

U.S. PATENT DOCUMENTS

| | | | |
|---|---|---|---|
| 7,541,918 B1* | 6/2009 | Rizzi ...................... | B60Q 1/444 340/438 |
| 2006/0080011 A1* | 4/2006 | Gaboury ............... | G01S 7/4004 701/29.7 |

(Continued)

FOREIGN PATENT DOCUMENTS

| | | |
|---|---|---|
| JP | 2012113410 | 6/2012 |
| KR | 20130063294 A | 6/2013 |

(Continued)

*Primary Examiner* — Masud Ahmed
(74) *Attorney, Agent, or Firm* — Fish & Richardson P.C.

(57) ABSTRACT

The present invention relates to a vehicle control device provided in a vehicle and a method of controlling the vehicle. A vehicle control device according to one embodiment of the present invention includes a communication unit configured to perform communication with a shoe, a sensing unit configured to sense information related to the vehicle and a position of the shoe, and a processor configured to control the communication unit such that the shoe outputs an alarm based on a situation in which the vehicle is to be accelerated or decelerated and the position of the shoe when the situation is detected through the sensing unit.

17 Claims, 29 Drawing Sheets

(51) Int. Cl.
*B60W 50/14* (2020.01)
*G07C 5/00* (2006.01)

(56) References Cited

U.S. PATENT DOCUMENTS

| | | | | |
|---|---|---|---|---|
| 2006/0284481 | A1* | 12/2006 | Yone | B60T 7/042 |
| | | | | 303/155 |
| 2008/0048423 | A1* | 2/2008 | Eriksson | B60N 3/066 |
| | | | | 280/748 |
| 2015/0149088 | A1* | 5/2015 | Attard | G01C 21/36 |
| | | | | 701/538 |
| 2015/0274179 | A1 | 10/2015 | Inoue | |
| 2015/0382321 | A1* | 12/2015 | Ryu | H04W 68/02 |
| | | | | 455/458 |
| 2016/0167578 | A1* | 6/2016 | Park | G08G 1/16 |
| | | | | 340/435 |

FOREIGN PATENT DOCUMENTS

| | | |
|---|---|---|
| KR | 20150018154 A | 2/2015 |
| KR | 10-1630727 | 6/2016 |
| KR | 20170022206 | 3/2017 |
| KR | 20170043401 A | 4/2017 |
| KR | 20170050362 A | 5/2017 |

\* cited by examiner

FIG. 1
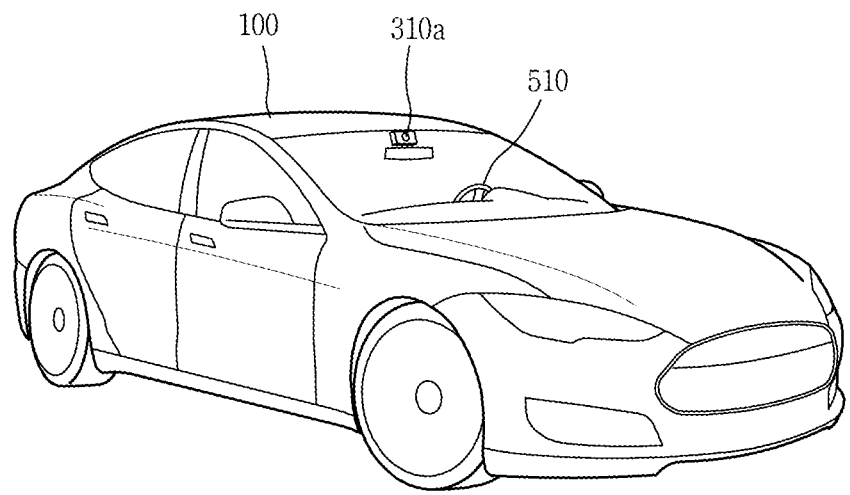
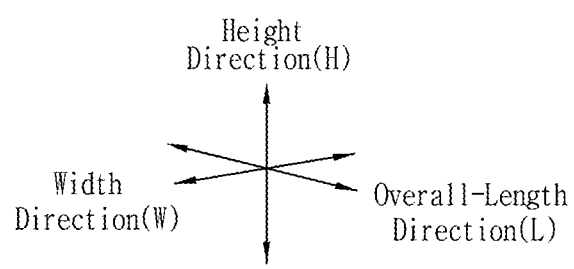

FIG. 11
[FIRST SITUATION TO ACCELERATE VEHICLE]
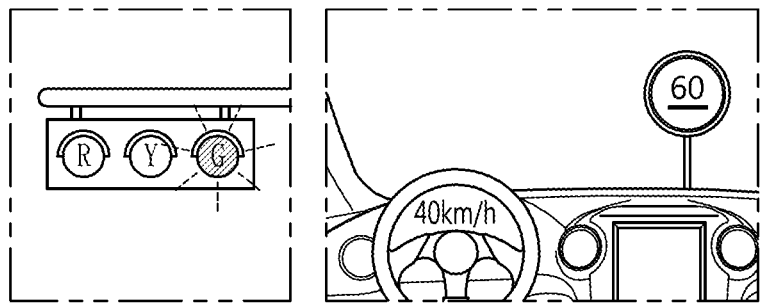
[SECOND SITUATION TO DECELERATE VEHICLE]
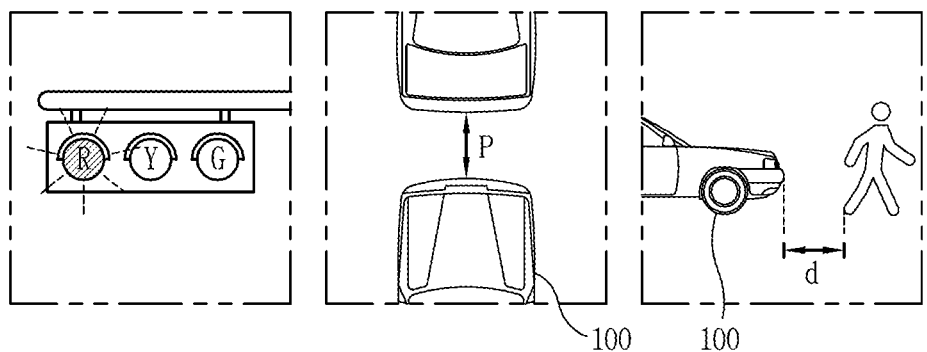

FIG. 13
(a) [FIRST SITUATION TO ACCELERATE VEHICLE]
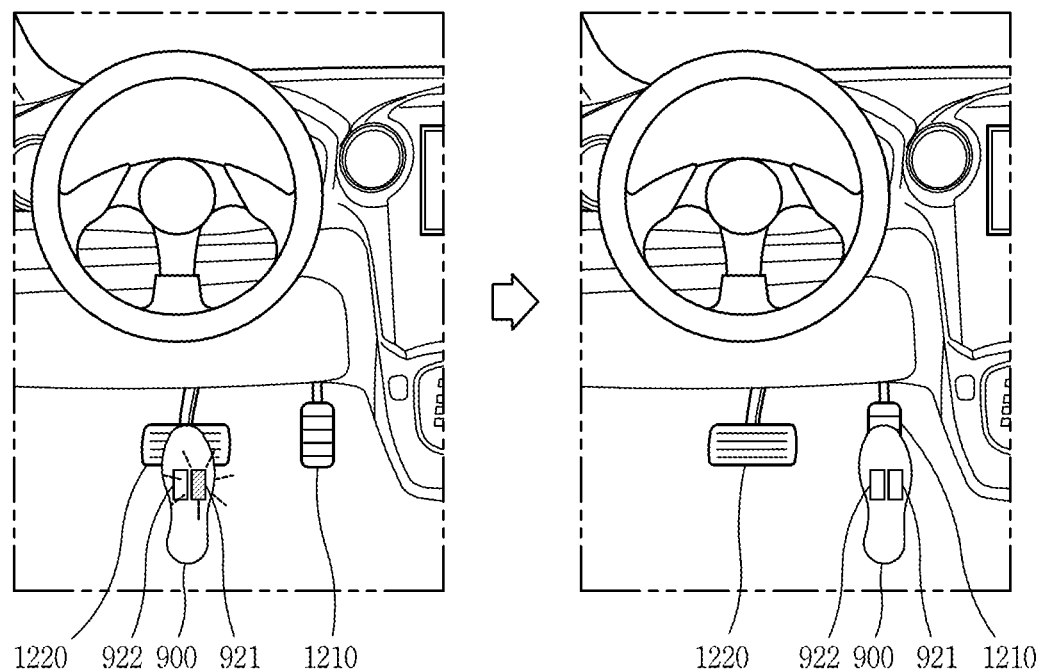
(b) [SECOND SITUATION TO DECELERATE VEHICLE]
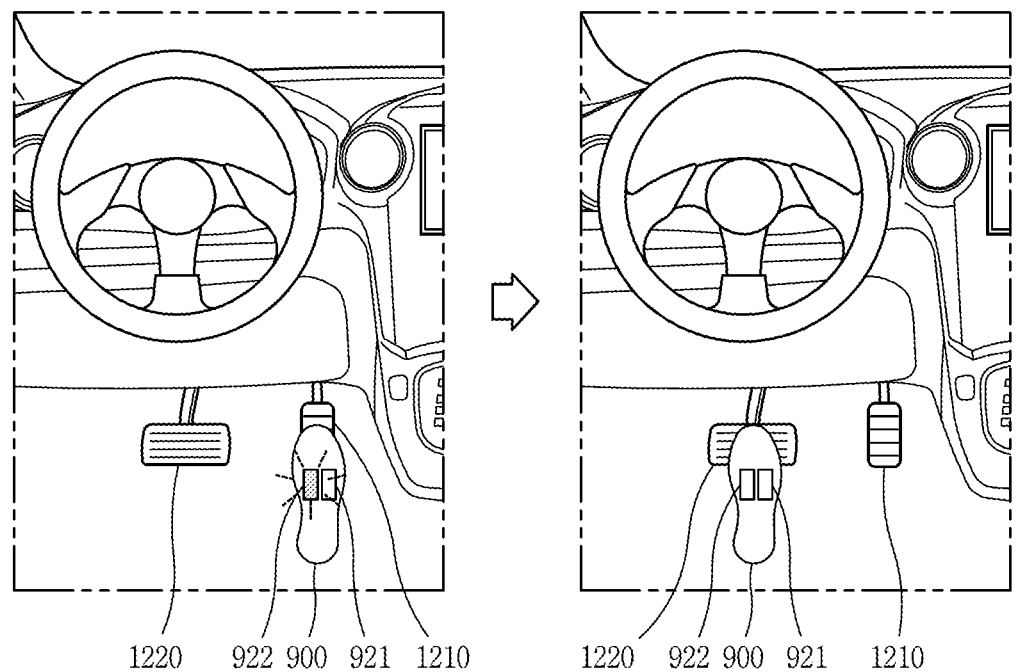

FIG. 15
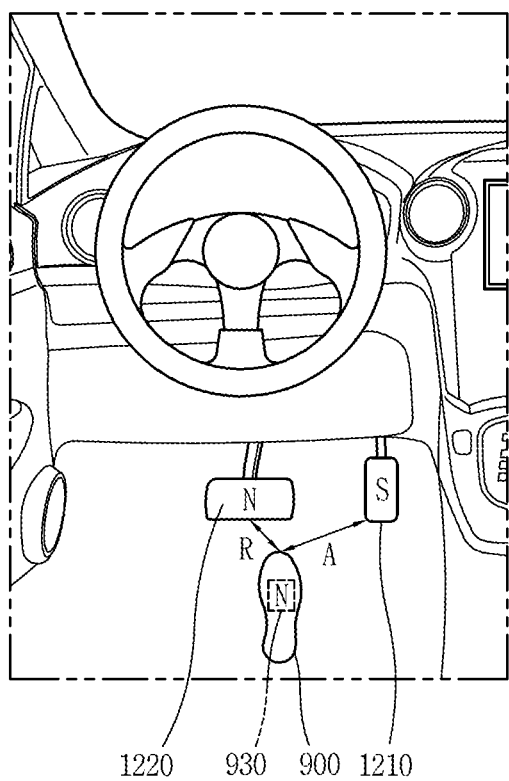
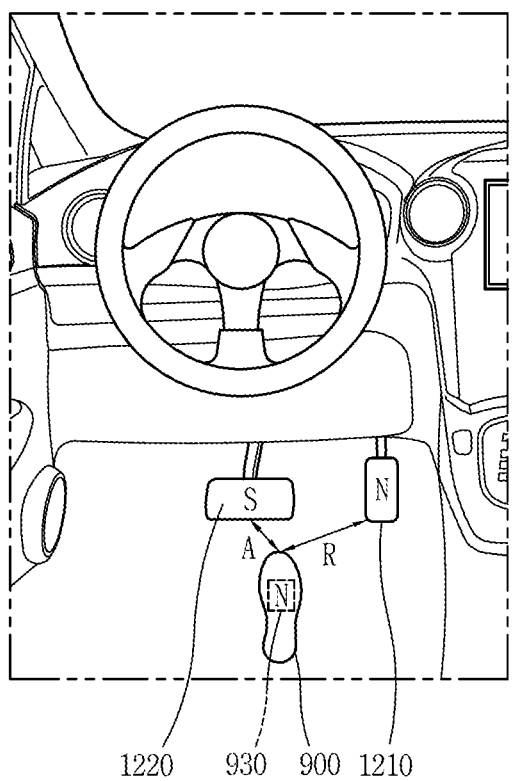
[FIRST SITUATION TO ACCELERATE VEHICLE]    [SECOND SITUATION TO DECELERATE VEHICLE]
(a)                                        (b)

FIG. 17
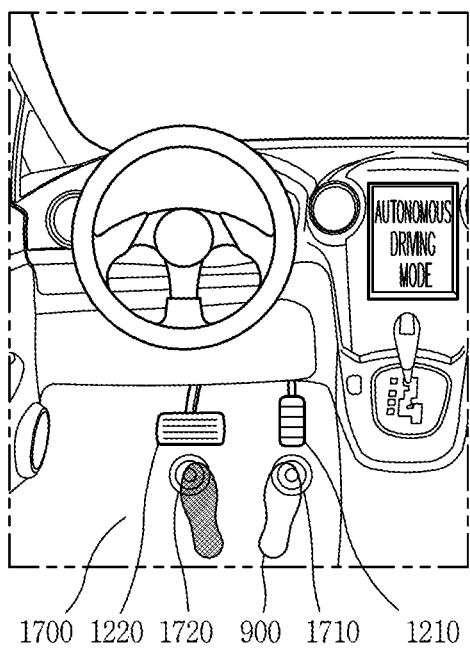
(a)
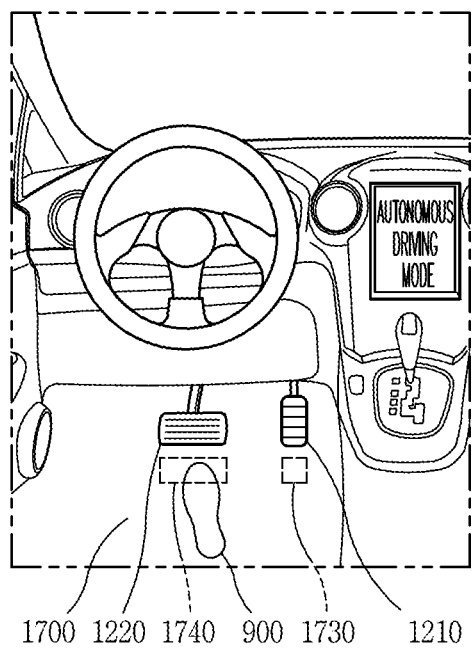
(b)

FIG. 18
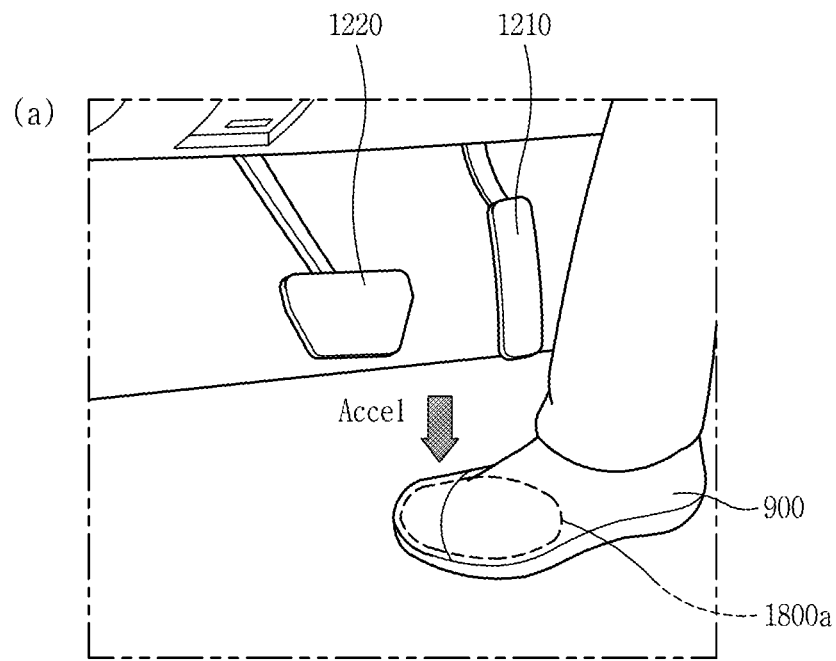
(a)
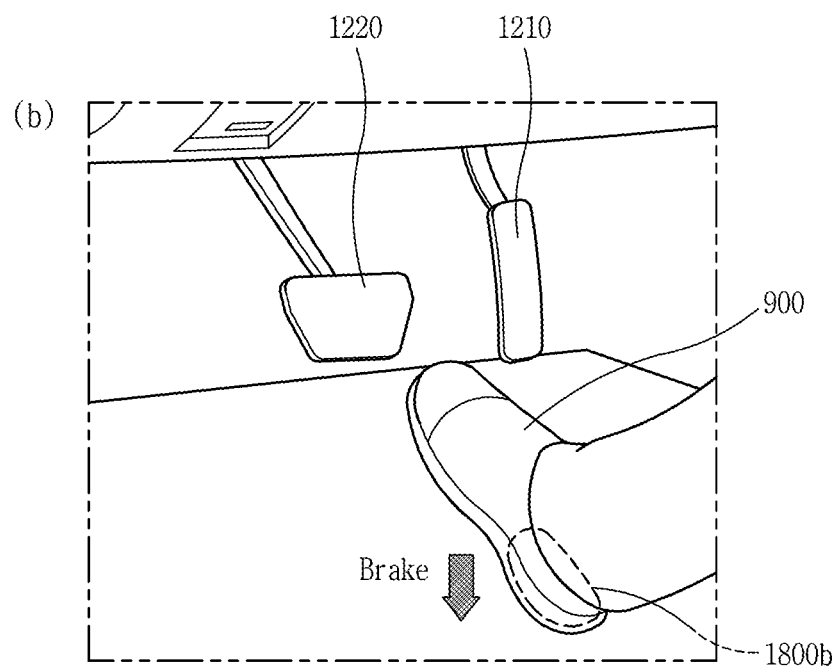
(b)

FIG. 19
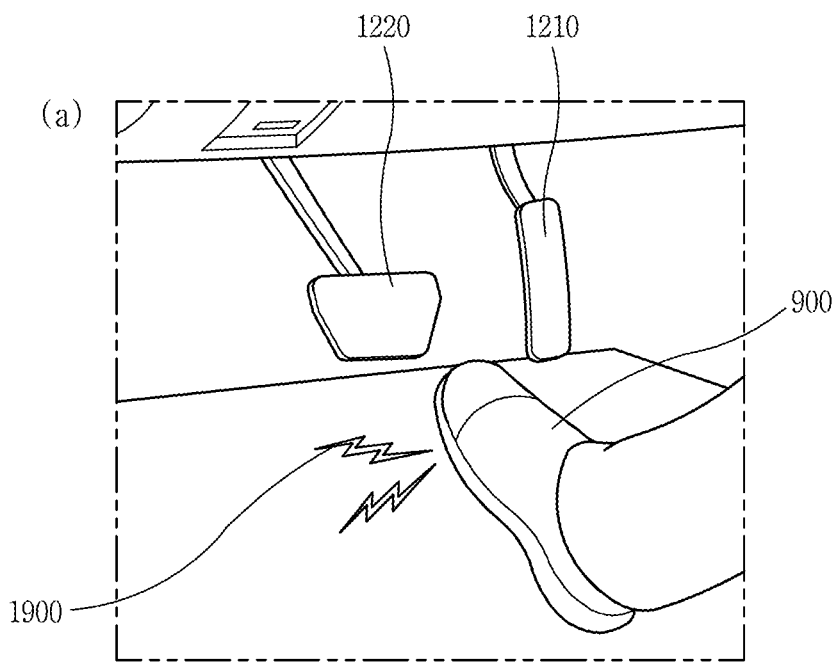
[AUTONOMOUS DRIVING MODE → MANUAL DRIVING MODE]
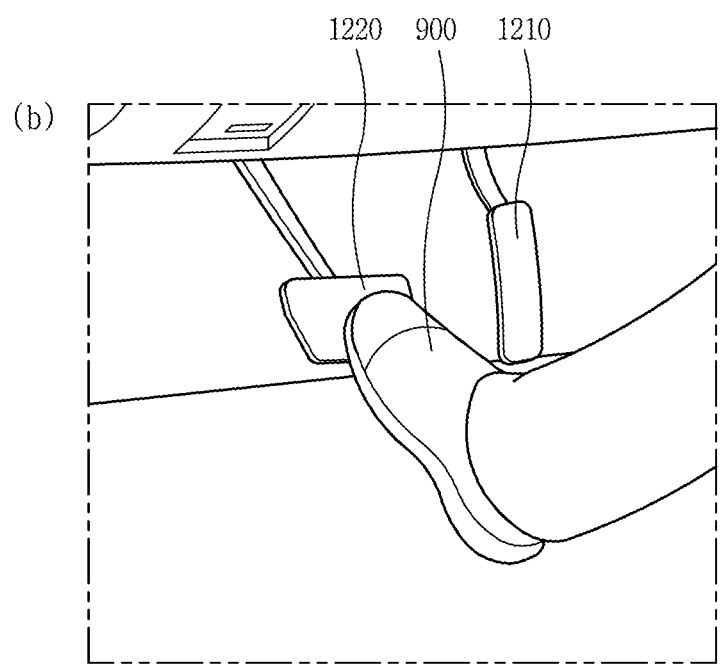

FIG. 21
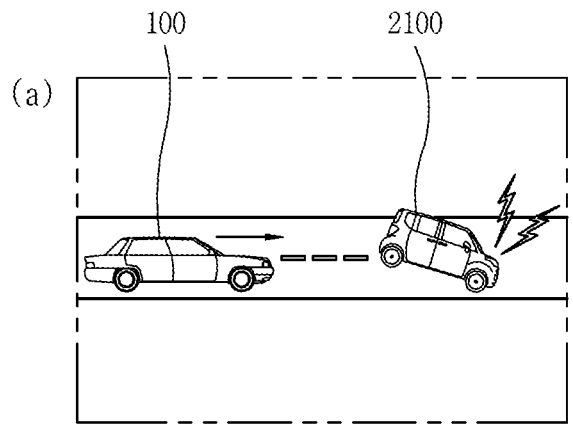
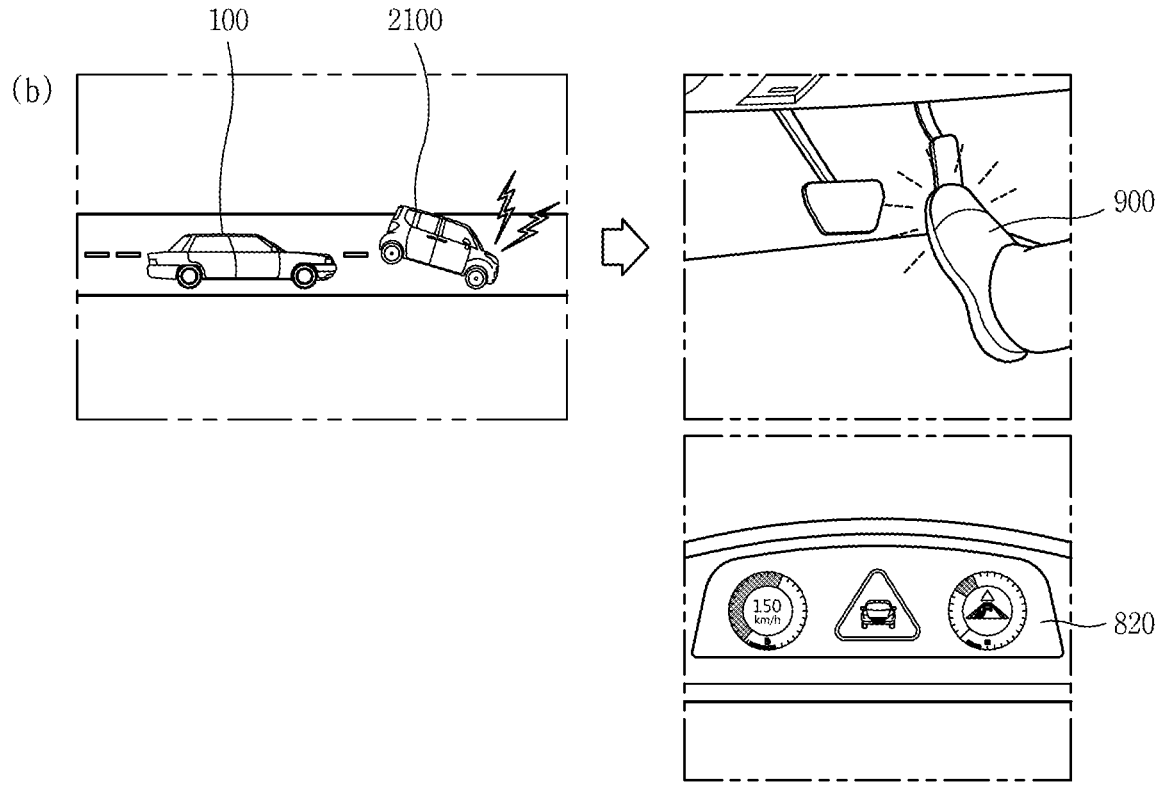

FIG. 22
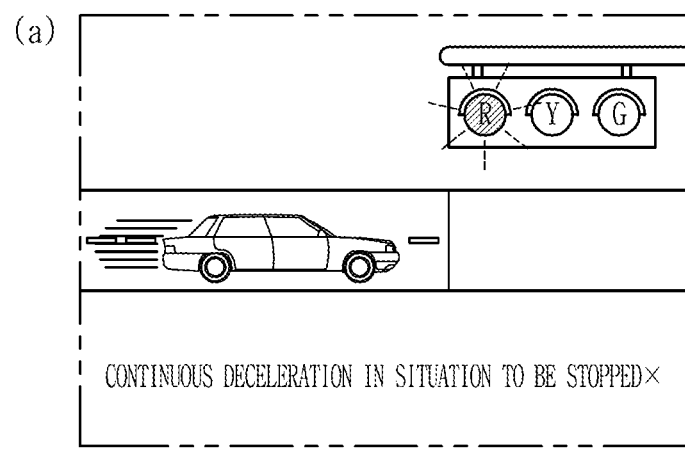
(a) CONTINUOUS DECELERATION IN SITUATION TO BE STOPPED×
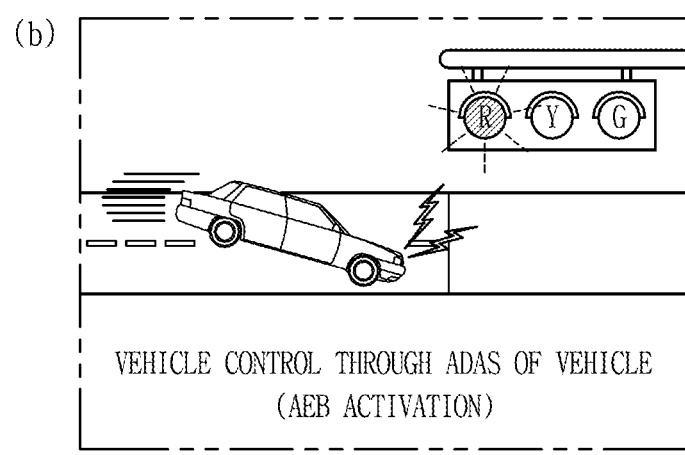
(b) VEHICLE CONTROL THROUGH ADAS OF VEHICLE (AEB ACTIVATION)
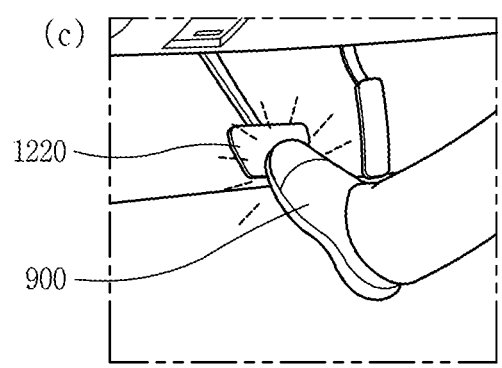

FIG. 23
(a)
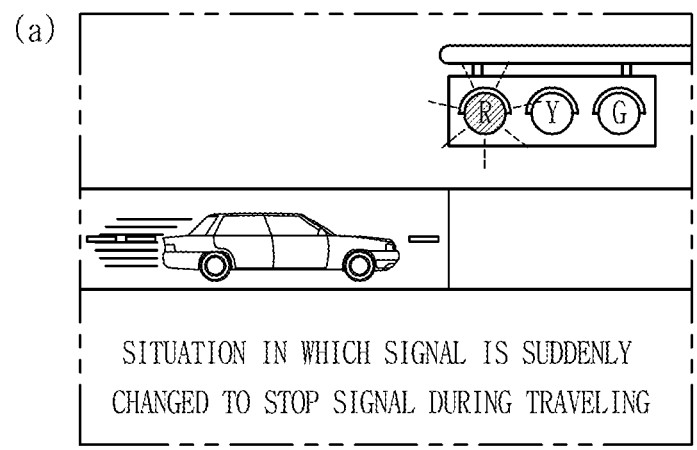
SITUATION IN WHICH SIGNAL IS SUDDENLY CHANGED TO STOP SIGNAL DURING TRAVELING
(b)
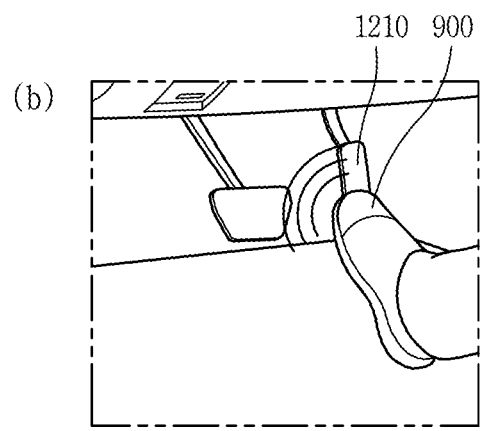
(c)
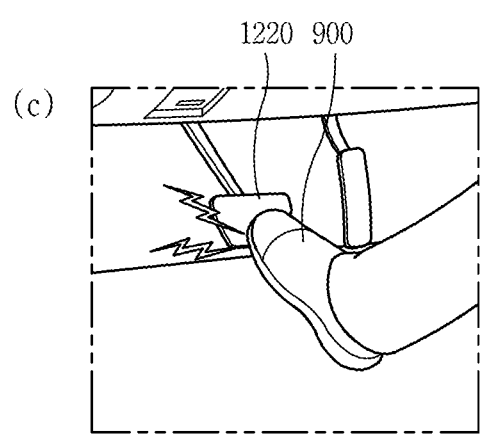

FIG. 25
(a)
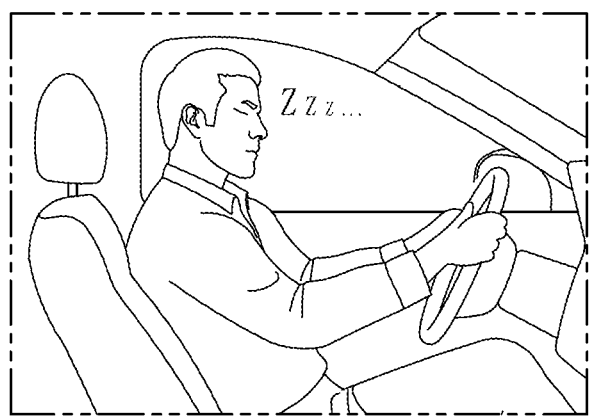
(b)
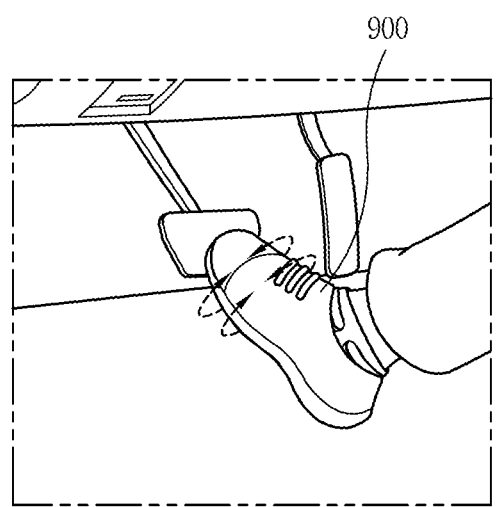
(c)
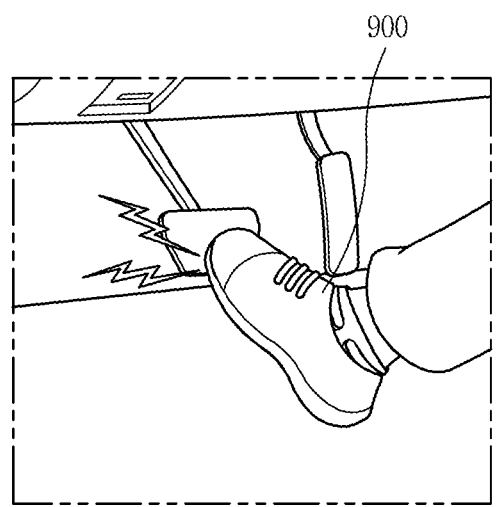

FIG. 28
(a)
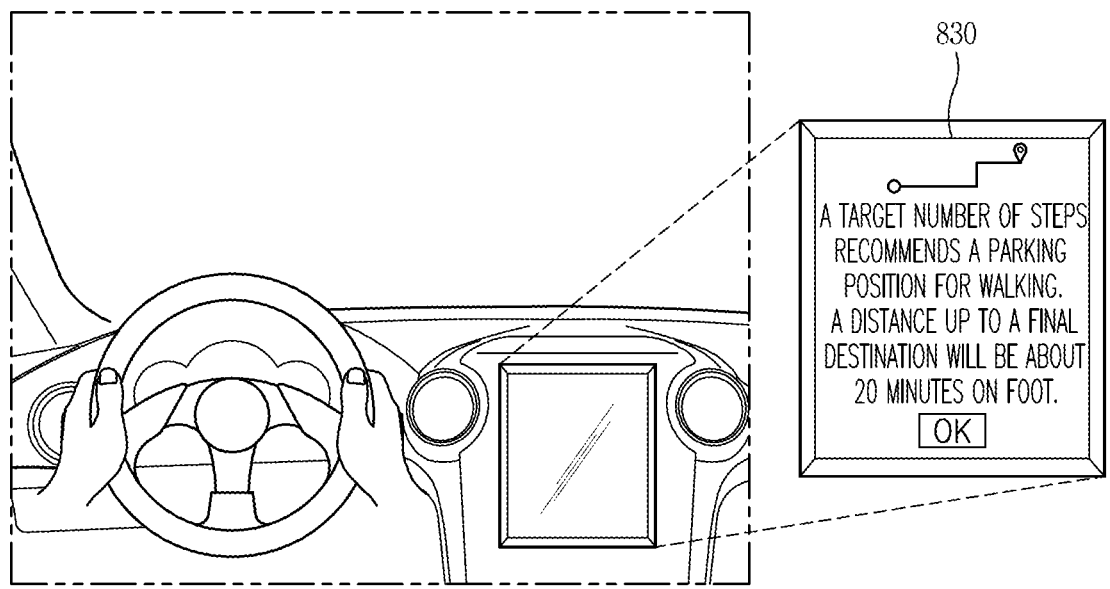
(b)
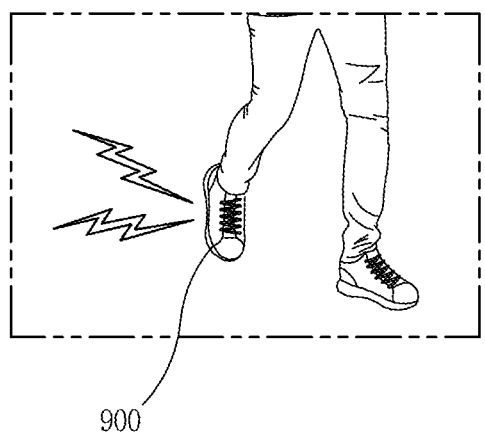

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0089807, filed on Jul. 14, 2017, the content of which is incorporated by reference herein in their entirety.

BACKGROUND OF THE INVENTION

1. Field of the Invention

The present invention relates to a vehicle control device mounted in a vehicle and a method for controlling the vehicle.

2. Background of the Invention

A vehicle is an apparatus capable of moving a user in the user-desired direction. Typically, a representative example may be a car.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

Meanwhile, as the development of the advanced driving assist system (ADAS) is actively undergoing in recent time, development of a technology for optimizing user's convenience and safety while driving a vehicle is required.

In recent years, wearable devices have been actively developed, and development of a vehicle control using the wearable devices is increasingly needed.

SUMMARY OF THE INVENTION

One aspect of the present invention is to provide a vehicle control device, capable of controlling shoes (or a shoe) in an optimized manner, and a method of controlling the vehicle.

Another aspect of the present invention is to provide a vehicle control device, capable of controlling a vehicle using a shoe in an optimized manner, and a method of controlling the vehicle.

Another aspect of the present invention is to provide a vehicle control device, capable of improving safety and convenience in driving a vehicle using a shoe, which serves to provide an optimized function related to the vehicle, and a method of controlling the vehicle.

The tasks to be solved in the present invention may not be limited to the aforementioned, and other problems to be solved by the present invention will be obviously understood by a person skilled in the art based on the following description.

To achieve these and other advantages and in accordance with the purpose of this specification, as embodied and broadly described herein, there is provided a vehicle control device, including a communication unit configured to perform communication with a shoe, a sensing unit configured to sense vehicle-related information and a position of the shoe, and a processor configured to control the communication unit such that the shoe outputs an alarm based on a situation in which the vehicle is to be accelerated or decelerated and the position of the shoe when the situation is detected through the sensing unit.

In an embodiment, the processor may decide a first situation in which the vehicle is to be accelerated or a second situation in which the vehicle is to be decelerated, based on the vehicle-related information, and output an alarm through the shoe based on the position of the shoe in the first situation or the second situation.

In an embodiment, the processor may control the communication unit so that the shoe outputs an alarm when the shoe is not positioned on an accelerator pedal in the first situation or when the shoe is not positioned on a brake pedal in the second situation.

In an embodiment, the processor may control the communication unit so that the shoe outputs an alarm through different portions thereof in the first situation and the second situation.

In an embodiment, the shoe may include a first alarm portion provided at a first position and a second alarm portion provided at a second position different from the first position. The processor may control the communication unit so that the first alarm portion of the shoe outputs an alarm when the vehicle is in the first situation, and control the communication unit so that the second alarm portion of the shoe outputs an alarm when the vehicle is in the second situation.

In an embodiment, the processor may control the communication unit to stop the output of the alarm when it is detected that the shoe is positioned on the accelerator pedal in the first situation or the shoe is positioned on the brake pedal in the second situation while the alarm is output.

In an embodiment, the first situation in which the vehicle is to be accelerated may include a case where a first signal associated with a traffic light is sensed or a case where the vehicle travels at a speed slower than the lowest speed of a currently-traveling road. Also, the second situation in which the vehicle is to be decelerated may include a case where a second signal associated with a traffic light is sensed, a case where collision possibility with a front-side vehicle is a predetermined value or more, or a case where a distance between an object located outside the vehicle and the vehicle is a predetermined distance or less.

In an embodiment, the processor may decide a degree that an accelerator pedal or a brake pedal is to be pressed for each of the situations, and control the communication unit so that the shoe outputs an additional alarm when the accelerator pedal or the brake pedal is pressed to a degree weaker than the decided degree.

In an embodiment, the shoe may be provided with a magnetic body, and each of an accelerator pedal and a brake pedal of the vehicle may be formed in a manner that a magnetic field direction is variable. The processor may control the magnetic field directions of the accelerator pedal and the brake pedal such that the shoe is positioned on the accelerator pedal in the first situation and the shoe is positioned on the brake pedal in the second situation.

In an embodiment, the processor may perform a preset function based on a pedal pressed by the shoe, sensed through the sensing unit, and a driving state of the vehicle.

In an embodiment, the processor may transmit the driving state of the vehicle to an external device through the communication unit when the shoe is pressing the brake pedal but the vehicle is accelerated.

In an embodiment, the processor may turn off the vehicle or drive the vehicle in an autonomous driving mode up to a preset place when the shoe is pressing the brake pedal but the vehicle is accelerated.

In the embodiment, a footboard of a driver's seat of the vehicle may be provided with a first pad corresponding to an accelerator pedal, and a second pad corresponding to a brake pedal, and the processor may control driving of the vehicle based on the shoe pressing the first pad or the second pad.

In an embodiment, the first pad and the second pad may be activated when a driving mode of the vehicle is in an autonomous running mode. When the driving mode of the vehicle is the autonomous driving mode, the processor may control driving of the vehicle based on the shoe pressing the first pad or the second pad, regardless of the situation in which the vehicle is to be accelerated or decelerated.

In an embodiment, the processor may accelerate the vehicle when the shoe is brought into contact with a first position adjacent to an accelerator pedal, and decelerate the vehicle when the shoe is brought into contact with a second position adjacent to the brake pedal, regardless of the situation in which the vehicle is to be accelerated or decelerated, when the vehicle is in the autonomous driving mode.

In an embodiment, the processor may accelerate the vehicle when a first portion of the shoe is brought into contact with a footboard of a driver's seat of the vehicle, and decelerate the vehicle when a second portion different from the first portion is brought into contact with the footboard of the driver's seat, regardless of the situation in which the vehicle is to be accelerated or decelerated, when the vehicle is in the autonomous driving mode.

In the embodiment, the processor may accelerate or decelerate the vehicle in proportion to an area where the shoe is brought into contact with the footboard of the driver's seat or intensity of the shoe pressing the footboard of the driver's seat.

A vehicle according to one embodiment of the present invention may include a vehicle control device described in this specification.

A method of controlling a vehicle according to one embodiment of the present invention may include connecting the vehicle to a shoe to perform communication with each other, sensing vehicle-related information and a position of the shoe, and outputting an alarm through the shoe based on a situation in which the vehicle is to be accelerated or decelerated and the position of the shoe when the situation is sensed.

In an embodiment, the outputting may be configured to decide a first situation in which the vehicle is to be accelerated or a second situation in which the vehicle is to be decelerated, based on the vehicle-related information, and output an alarm through the shoe when the shoe is not positioned on an accelerator pedal in the first situation or when the shoe is not positioned on a brake pedal in the second situation.

The details of other embodiments are included in the detailed description and drawings.

According to an embodiment of the present invention, one or more of the following effects can be provided.

First, the present invention can provide a new shoe which can help driving of the vehicle.

Second, the present invention can provide a system that can provide an alarm to a user in an optimized manner according to a state of the vehicle through a shoe.

Third, the present invention can provide a new user interface that can output an alarm to the user on the basis of a position of a shoe in a situation in which the vehicle is to be accelerated and a situation in which the vehicle is to be decelerated, so as to remarkably improve safety and convenience in driving the vehicle.

Fourth, the present invention can provide a new user interface that can control driving of a vehicle using a shoe in an autonomous driving mode.

The effects of the present invention are not limited to those effects mentioned above, and other effects not mentioned may be clearly understood by those skilled in the art from the description of the appended claims.

BRIEF DESCRIPTION OF THE DRAWINGS

FIG. 1 is a view illustrating an appearance of a vehicle according to an embodiment of the present invention.

FIGS. 11, 12, 13, 14, 15, 16, 17, 18, 19, 20, 21, 22, 23, 24, 25, 26, 27, 28, 29, and 30 are conceptual views illustrating the control method illustrated in FIG. 10.

DETAILED DESCRIPTION OF THE INVENTION

Figure 2:
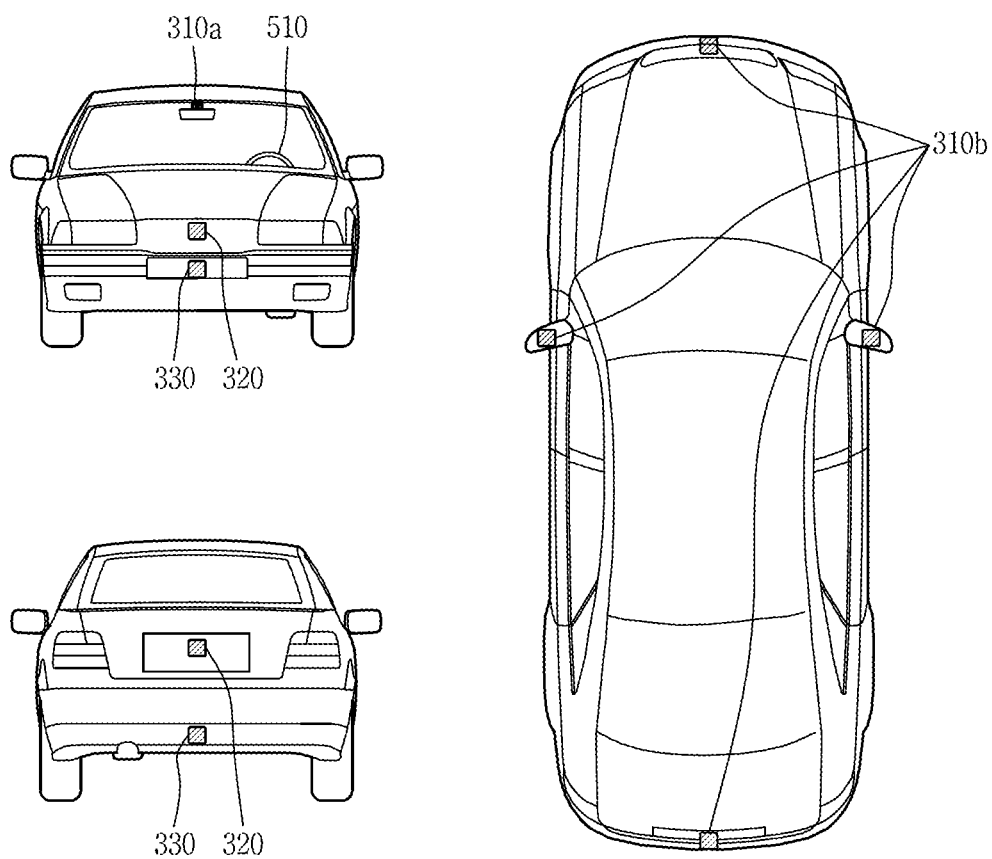
FIG. 2 is a view in which a vehicle according to an embodiment of the present disclosure is seen at various angles.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating appearance of a vehicle in accordance with an embodiment of the present invention.

FIG. 2 is a view illustrating appearance of a vehicle at various angles in accordance with an embodiment of the present invention.

Figure 3:
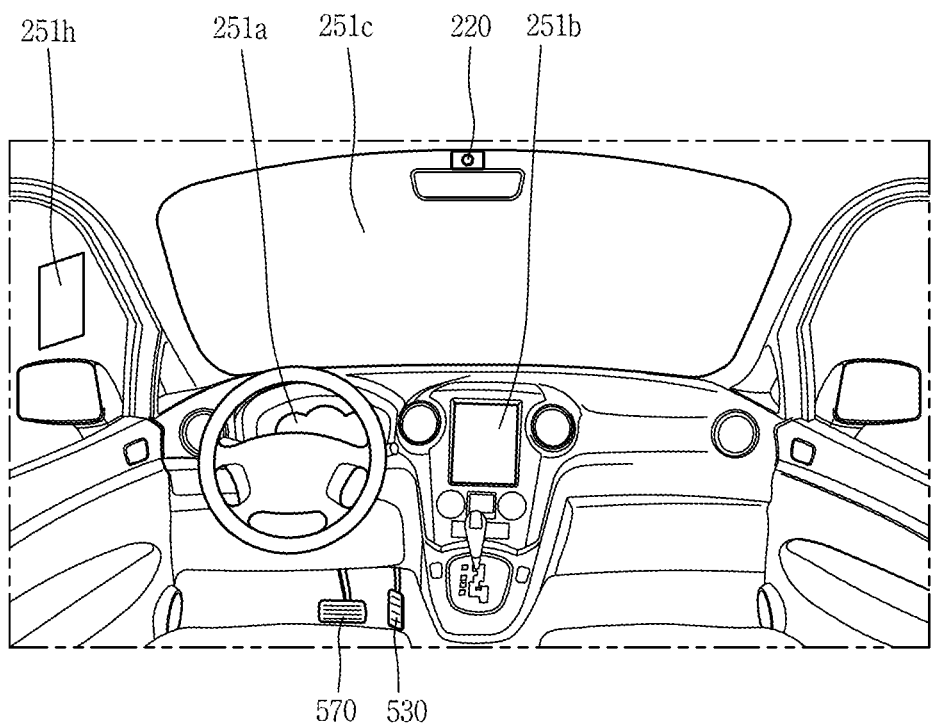
FIGS. 3 and 4 are views illustrating an inside of a vehicle according to an embodiment of the present invention.
Figure 4:
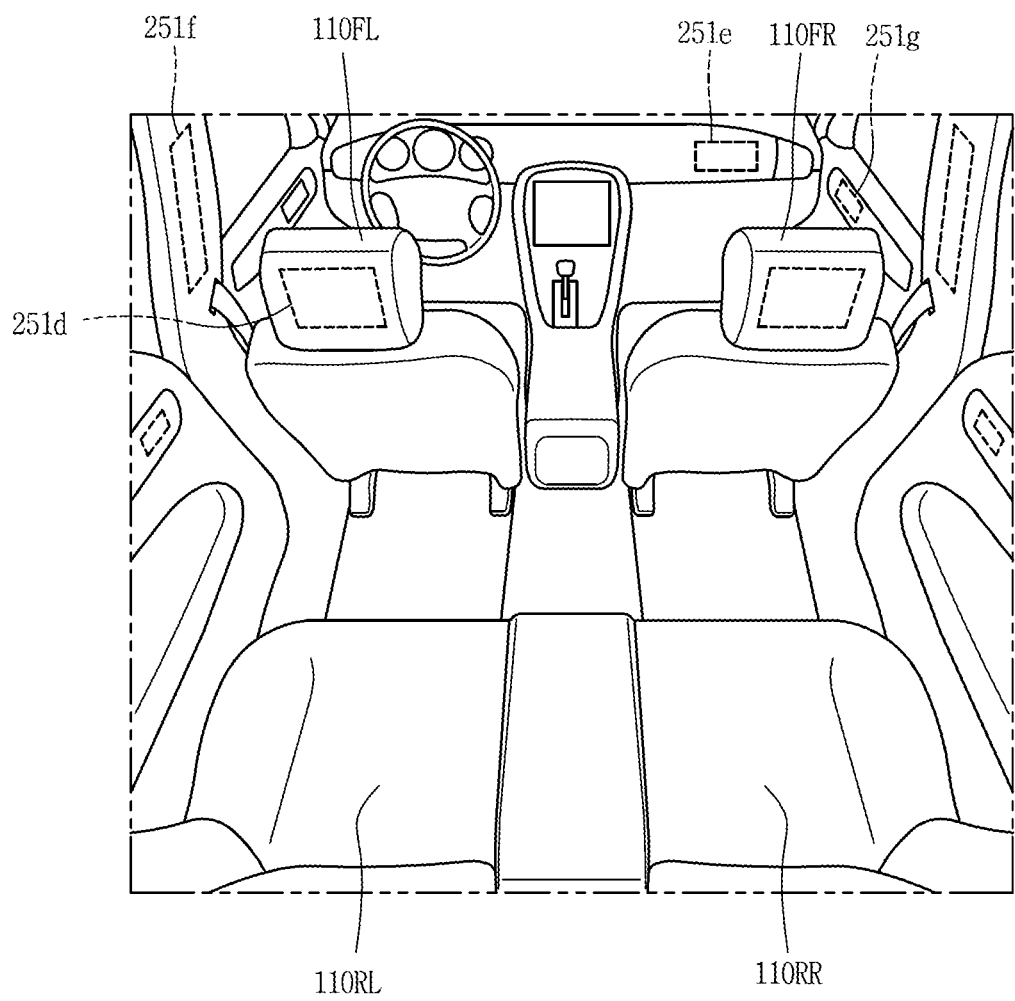

FIGS. 3 and 4 are views illustrating an inside of a vehicle in accordance with an embodiment of the present invention.

Figure 5:
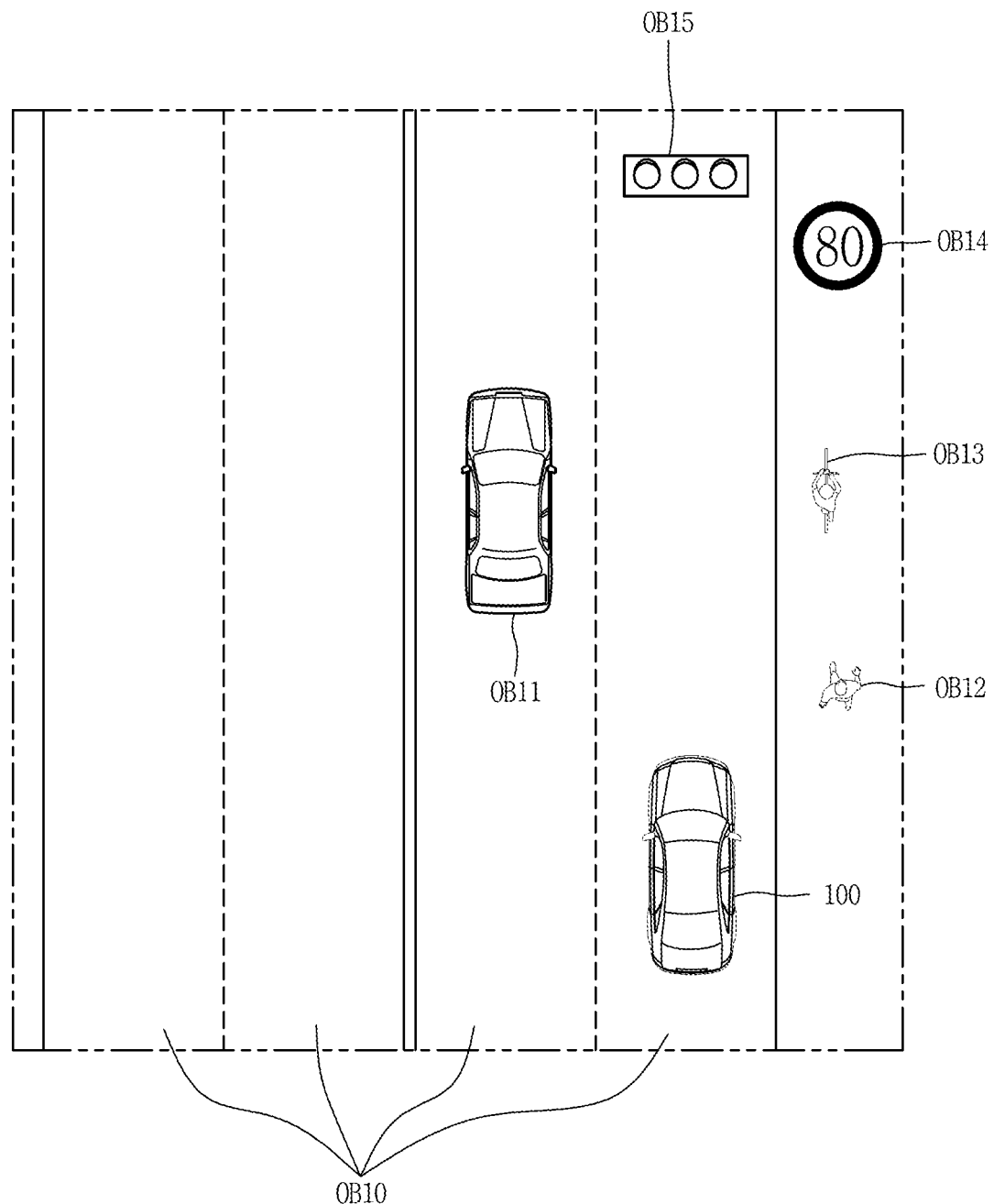
FIGS. 5 and 6 are views illustrating objects according to an embodiment of the present invention.
Figure 6:
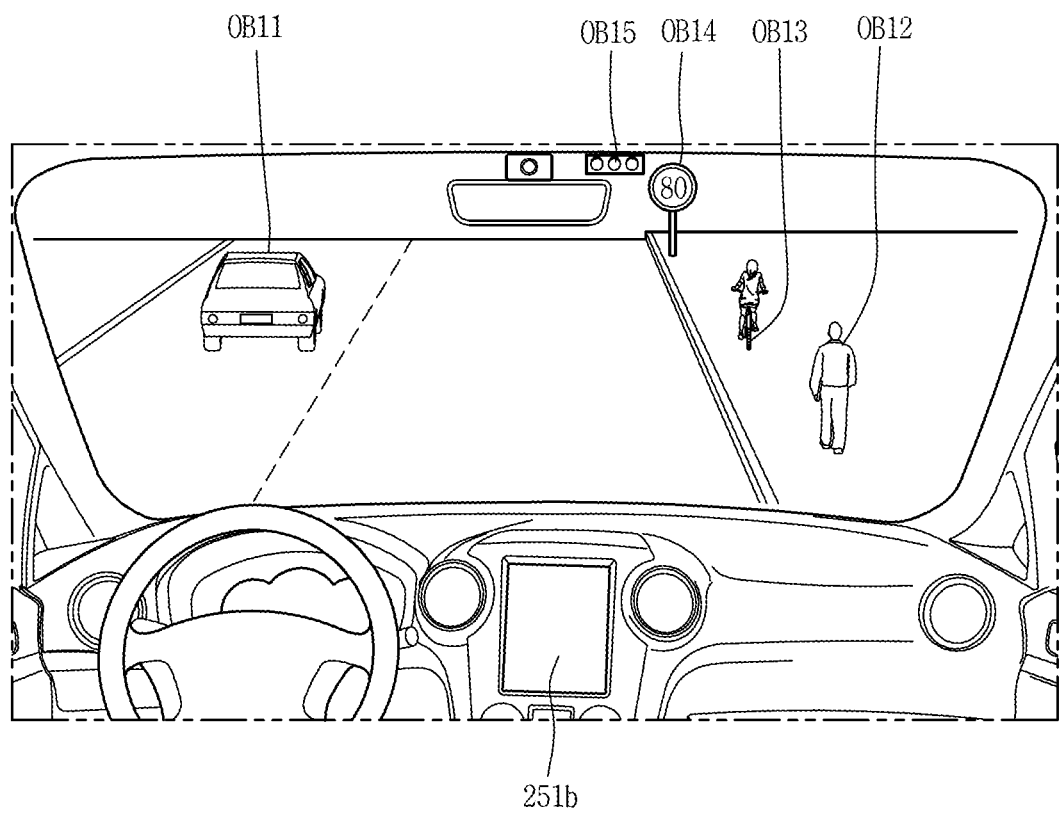

FIGS. 5 and 6 are reference views illustrating objects in accordance with an embodiment of the present invention.

Figure 7:
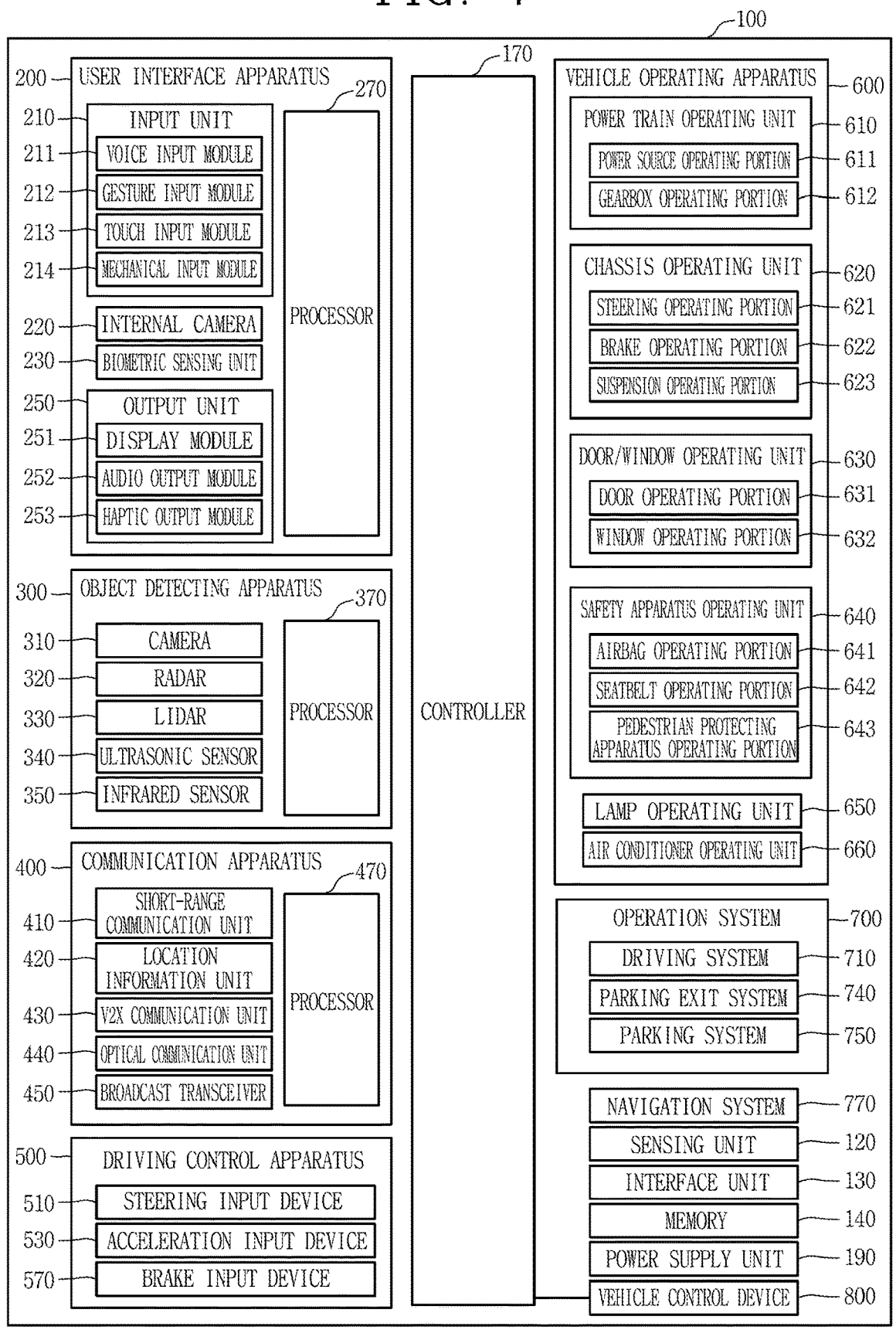
FIG. 7 is a block diagram referred for explaining a vehicle according to an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present invention may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of the components included in the vehicle control device 800 according to an embodiment of the present invention with reference to the accompanying drawings.

Figure 8:
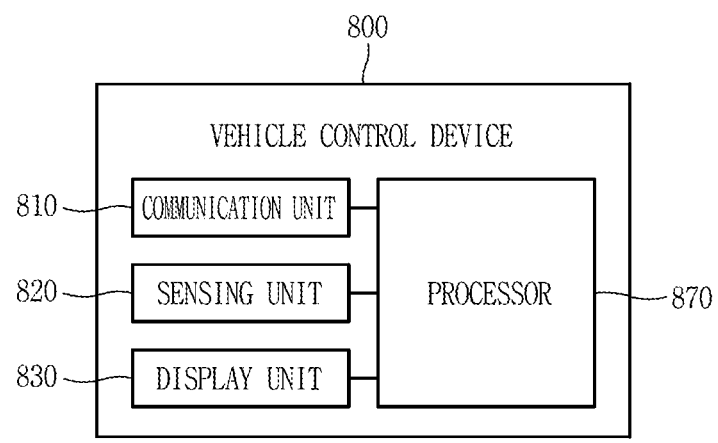
FIG. 8 is a conceptual view illustrating a vehicle control device according to an embodiment of the present invention.

FIG. 8 is a conceptual view illustrating a vehicle control device according to an embodiment of the present invention.

As illustrated in FIG. 8, the vehicle control device 800 according to the present invention may include a communication unit 810, a sensing unit 820, a display unit 830, a processor 870 and the like.

First, the vehicle control device 800 according to the present invention may include a communication unit 810.

The communication unit 810 may be the communication device 400 described above. The communication unit 810 may be connected to a device (shoes in this invention) existing in the vehicle 100 to perform communication with the device. Such communication-available device, for example, may include a mobile terminal, a wearable device, a device having a communication unit (or a communication module or a communication device), and the like.

The communication unit 810 may be configured to perform communication with the shoes. In one example, the vehicle control device 800 (or vehicle 100) and the shoes may be connected to each other to allow wireless communication therebetween through the communication unit 810. The vehicle control device 800 and the shoes may be wirelessly connected to each other so as to enable wireless communication with each other according to a user request. Or, if they have been connected before to allow the wireless communication, the vehicle control device and the shoes may be wirelessly connected to enable the wireless communication therebetween, in response to an entrance of the shoes into the vehicle.

The communication unit 810 may be provided in the vehicle (or in the vehicle control device), or may be in a form of a separate module so as to perform communication with (to be electrically coupled to) components of the vehicle.

The vehicle control device 800 may control a shoe 900 through the communication unit 810.

Specifically, the vehicle control device 800 may transmit a control signal to the shoe 900 through the communication unit 810 so as to control the shoe 900. The shoe 900 may perform a function/operation/control corresponding to the control signal when the control signal is received.

Conversely, the present invention may enable the shoe 900 to control the vehicle control device 800 (or the vehicle 100). Specifically, the shoe 900 may transmit a control signal for controlling the vehicle to the vehicle control device 800. In response to this, the vehicle control device 800 may perform the function/operation/control corresponding to the control signal transmitted from the shoe 900.

In addition, the vehicle control device 800 related to the present invention may include a sensing unit 820. The sensing unit 820 may be the object detecting apparatus 300 described with reference to FIG. 7 or the sensing unit 120 provided in the vehicle 100.

The sensing unit 820 may also be implemented in combination of at least two of the camera 310, the radar 320, the LiDAR 330, the ultrasonic sensor 340 and the infrared sensor 350 provided in the object detecting apparatus 300, and the sensing unit 120.

The sensing unit 820 may sense information related to the vehicle 100 of the present invention.

The information related to the vehicle may be at least one of vehicle information (or a driving status of the vehicle) and the surrounding information related to the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parting mode, automatic parking mode, manual parking mode), whether or not a user is present in the vehicle, information associated with the user (for example, whether or not the user is an authenticated user), and the like.

The surrounding information of the vehicle, for example, may be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, ambient brightness of the vehicle, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information (or surrounding environment information) of the vehicle may include external information related to the vehicle (e.g., ambient brightness, temperature, a position of the sun, information related to nearby subject (a person, another vehicle, a sign, etc.), a type of a driving road surface, a landmark, line information, and driving lane information), and information required for an autonomous driving/autonomous parking/automatic parking/manual parking mode.

In addition, the surrounding information may further include a distance from an object existing around the vehicle to the vehicle 100, a type of the object, a parking space for the vehicle, an object for identifying the parking space (for example, a parking line, a string, another vehicle, a wall, etc.), and the like.

Further, the information related to the vehicle may include whether or not a mobile terminal is placed in a rack provided in the vehicle, whether or not the mobile terminal has entered (exists) in the vehicle, whether the mobile terminal has entered (exists) within a predetermined distance from the vehicle, whether or not the mobile terminal and the vehicle control device are connected to each other to enable communication therebetween, and the like.

The information related to the vehicle sensed through the sensing unit 820 may be used in an autonomous driving mode for autonomous driving of the vehicle. Specifically, the processor 870 may control the vehicle to travel in an autonomous driving mode, by using information related to the vehicle sensed through the sensing unit 820.

Meanwhile, the sensing unit 820 may further include an internal camera 220.

For example, the internal camera 220 may be arranged to capture a space in which an accelerator pedal and a brake pedal provided in a driver's seat are present. In the space, a lower part of a driver's body (for example, the driver's feet and the driver's shoes) may exist.

The sensing unit 820 may sense (decide, determine, detect, extract) information related to the shoes worn by the driver, based on an image received through the internal camera 220.

In one example, the information related to the shoe (or a pair of shoes) may include a position of the shoe, whether the shoe is in contact with the accelerator pedal or brake pedal, whether the shoe is pressing the accelerator pedal or the brake pedal, and the like.

That is, the sensing unit 820 according to the present invention may sense the information related to the vehicle and the position of the shoe.

In addition, the vehicle control device 800 related to the present invention may include a display unit 830.

The display unit 830 included in the vehicle control device 800 according to the present invention, which is a display device provided in the vehicle 100, may be the display module 251 described above.

The processor 830 may be the output unit 250 or the display module 251 illustrated in FIG. 7. The display unit 830 may include an output unit (e.g., a touch screen) of a mobile terminal that can perform communication with the communication device 400.

The display unit 830 may include a transparent display. The transparent display may be attached to the windshield or the window.

The display module 830 may be disposed on one area of a steering wheel, one area 251a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

For example, the display unit 830 may include a cluster, a center fascia (CID), a navigation device, a head-up display (HUD), and the like.

The display unit 830 may have an inter-layered structure or an integrated structure with a touch sensor in order to implement a touch screen. The touch screen may function as the user input unit 210 which provides an input interface between the vehicle 100 (or the vehicle control device 800) and the user and simultaneously provide an output interface between the vehicle 100 (or the vehicle control device 800) and the user.

The processor 870 may output various information related to the vehicle to the display unit 830. In addition, the processor 870 may output the information related to the vehicle to a different position of the display unit 830 according to a type of information related to the vehicle.

Various information output to the display unit 830 will be described later in detail with reference to the accompanying drawings.

The display unit 830 may be a navigation system 770 (or a navigation device). Also, the display unit 830 may include a navigation system 770.

That is, the display unit 830 may refer to a navigation device provided in the vehicle 100. The navigation device may be built in the vehicle 100 from shipment of the vehicle 100 or a navigation device mounted by the user.

The display unit 830 may refer to a navigator for a vehicle, and may be a navigation system independent of the navigation system provided by the mobile terminal 900.

The description of the display unit 830 in this specification may be applied to a navigation system 770, a navigation device, or a navigator for vehicle in the same or similar manner.

Meanwhile, the vehicle control device 800 of the present invention may include the processor 870 for controlling the camera 810, the sensing unit 820, and the like.

The processor 870 may be the controller 170 described in FIG. 7.

The processor 870 may control the components described in FIG. 7 and the components described in FIG. 8.

For example, the processor 870 may sense (decide, determine, detect, extract) a situation in which the vehicle must be accelerated or decelerated, based on information related to the vehicle sensed through the sensing unit 820. In addition, the processor 870 may sense a position of the shoe 900 through the sensing unit 820.

When the situation in which the vehicle 100 must be accelerated or decelerated is sensed through the sensing unit 820, the processor 870 may control the communication unit 810 such that the shoe 900 outputs an alarm, based on the situation and the position of the shoe.

In this specification, the process in which the processor 870 controls the communication unit 810 so that the shoe 900 performs a specific operation/function/control may be understood as meaning that the processor 870 controls the shoe 900 through the communication unit 810 to perform the specific operation/function/control or performs the specific operation/function/control through the shoe 900.

For example, the process in which the processor 870 controls the communication unit 810 so that the shoe 900 outputs the alarm may include meaning that the processor 870 controls the shoe 900 to output the alarm, meaning that the processor 870 controls the shoe 900 so that the alarm is output through the shoe 900, or meaning that the processor 870 outputs the alarm through the shoe 900.

Hereinafter, description will be given in more detail of a shoe 900 configured to perform communication with the vehicle control device 800, with reference to the accompanying drawings.

Figure 9:
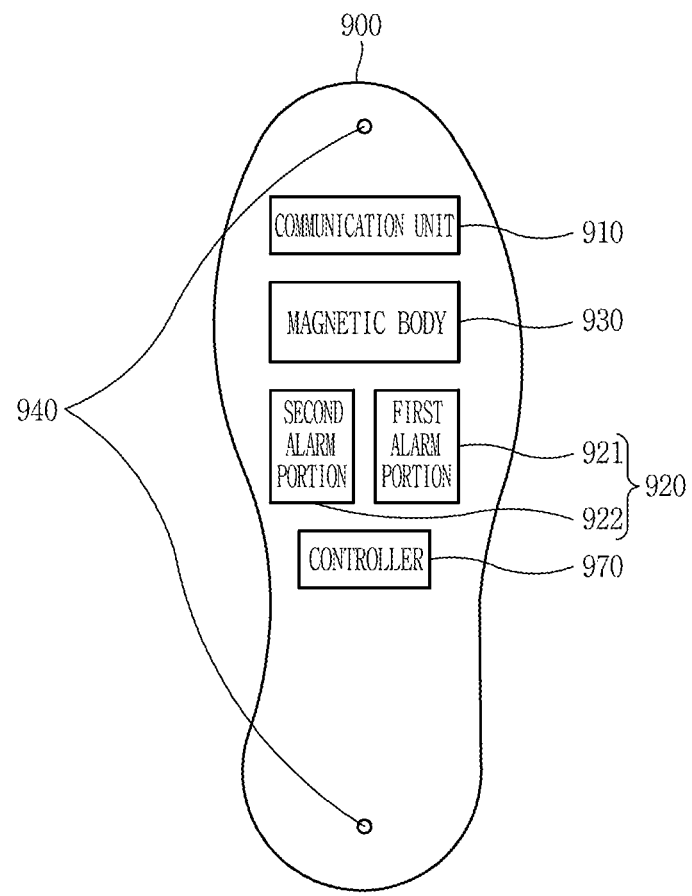
FIG. 9 is a conceptual view illustrating a shoe according to an embodiment of the present invention.

FIG. 9 is a conceptual view illustrating a shoe according to an embodiment of the present invention.

The shoe 900 related to the present invention may include a communication unit 910, an alarm unit 920, a magnetic body 930, a sensing unit 940, and a controller 970.

The shoe 900 may be formed to be wearable on the user's foot.

The shoe 900 described in this specification may perform communication through the communication unit 910. The shoe 900 may perform communication with an external device (for example, the vehicle control device 800) through the communication unit 910.

In this regard, the shoe 900 may be understood as one embodiment of a mobile terminal. Also, the shoe 900 may be understood as one embodiment of a wearable device in that it is formed to be wearable by the user and is configured to perform communication.

The communication unit 910 included in the shoe 900 may be connected to perform communication with the communication unit 810 of the vehicle control device 800. The communication unit 910 may include the technical features of the communication device 400 described above.

The alarm unit 920 may be configured to output an alarm under the control of the vehicle control device 800 received through the controller 970 or the communication unit 910. Here, the alarm unit 920 may output the alarm in various forms, such as vibration, sound, screen output, and the like.

The alarm unit 920 may include a first alarm portion 921 and a second alarm portion 922 disposed at different positions. The first alarm portion 921 may be disposed with being spaced apart from the second alarm portion 922.

The first alarm portion 921 and the second alarm portion 922 may be independently controlled. For example, when the first alarm portion 921 outputs an alarm, the second alarm portion 922 may not output an alarm.

The first alarm portion 921 and the second alarm portion 922 may output alarms in a manner of varying a degree of vibration, a volume level of sound, or brightness of a screen.

However, the present invention is not limited to this, and the first alarm portion 921 and the second alarm portion 922 may output alarms together.

The first alarm portion 921 and the second alarm portion 922 may independently output alarms under the control of the controller 970 or the vehicle control device 800.

In this specification, the shoe 900 outputting an alarm may refer to the alarm unit 920 outputting an alarm through at least one of the first alarm portion 921 and the second alarm portion 922.

The magnetic body 930 may refer to an object having magnetic properties. The magnetic body 930 provided in the shoe 900 of the present invention may be formed so as to change a magnetic property under the control of the controller 970 (or the vehicle control device 800).

The magnetic body 930 may have, for example, an N pole or an S pole. The magnetic body 930 may have an N pole or S pole which is decided or varied under the control of the controller 970 (or the vehicle control device 800).

The magnetic body 930 may be formed to have an N pole or S pole under the control of the controller 970 (or the vehicle control device 800). That is, the magnetic body 930 may not have any magnetic property under the control of the controller 970 (or the vehicle control device 800).

An embodiment related to the magnetic body 930 will be described later in detail with reference to FIG. 15.

Meanwhile, the shoe 900 may further include a sensing unit 940. The sensing unit 940 may include the technical features of the sensing unit 820 of the vehicle control device 800. For example, the sensing unit 940 may use, for example, a pressure sensor to determine which part of the shoe has been brought into contact with a footboard.

In addition, the shoe 900 may include the controller 970 that is capable of controlling the components described above.

The controller 970 may independently control the components of the shoe or may control the components of the shoe based on a control command of the vehicle control device 800 received through the communication unit 910.

Controlling the shoe 900 in this specification may be understood as the controller 970 controlling the components of the shoe 900 based on a control command received from the vehicle control device 800. Also, controlling the shoe 900 may be understood as the controller 970 controlling the components of the shoe 900 based on a preset algorithm.

Hereinafter, various embodiments in which the vehicle control device 800 controls the shoe 900 in the present invention will be described in more detail with reference to the accompanying drawings.

Figure 10:
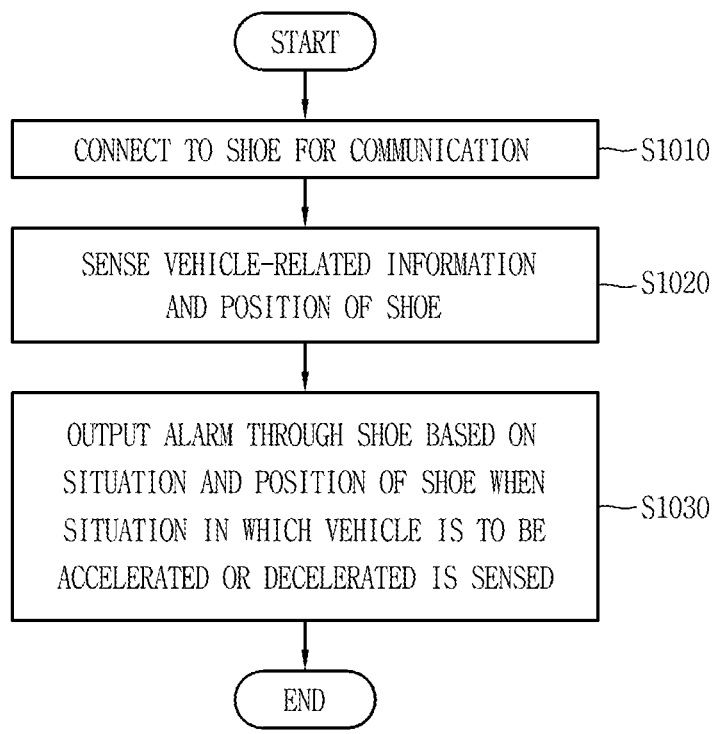
FIG. 10 is a flowchart illustrating a representative control method according to the present invention.

FIG. 10 is a flowchart illustrating a representative control method of the present invention. FIGS. 11, 12, 13, 14, 15, 16, 17, 18, 19, 20, 22, 23, 24, 25, 26, 27, 28, 29, and 30 are conceptual views illustrating the control method illustrated in FIG. 10.

Referring to FIG. 10, in the present invention, the vehicle control device 800 is connected to the shoe 900 to perform communication with the shoe 900 (S1010).

In detail, the processor 870 of the vehicle control device 800 may be connected to the communication unit 910 of the shoe 900 through the communication unit 810 thereof so as to perform communication with the communication unit 910.

At this time, the processor 870 may be connected to the shoe 900 to perform communication with the shoe 900, based on a satisfaction of a preset condition.

For example, the preset condition may include when a driver is detected to be aboard the vehicle 100, when a door of the vehicle 100 is changed from a closed state into an open state, when a shoe is moved in a preset motion by the driver aboard the vehicle 100, when a user request for a communication connection is received, or the like.

The processor 870 may decide (determine, detect, sense) whether the preset condition is satisfied by using the sensing unit 820.

In addition, the vehicle control device and the shoe of the present invention may be connected to each other to enable mutual communication in various manners.

Thereafter, in the present invention, the vehicle control device senses vehicle-related information and a position of the shoe (S1020).

In detail, the processor 870 may sense the vehicle-related information and the position of the shoe through the sensing unit 820, in a connected state with the shoe 900 to enable communication through the communication unit 810.

The shoe may refer to a shoe located in the driver's seat. That is, the shoe is preferably a shoe that the driver wears.

The processor 870 may sense the information related to the vehicle through the sensing unit 820. The information related to the vehicle may include information used to determine a situation in which the vehicle is to be accelerated and a situation in which the vehicle is to be decelerated.

For example, the information related to the vehicle may include traffic light information, sign information, other vehicle information, or information related to a specific object (e.g., person, bicycle, building, obstacle, etc.), located in the vicinity of the vehicle.

In addition, the processor 870 may sense the position of the shoe through the sensing unit 820. For example, the processor 870 may sense the information related to the shoe 900 located in the driver's seat (the position of the shoe), using the internal camera 220 included in the sensing unit 820.

Thereafter, in the present invention, when a situation in which the vehicle 100 is to be accelerated or decelerated is detected, the vehicle control device 800 outputs an alarm through the shoe based on the situation and the position of the shoe (S1030).

The processor 870 may decide a first situation in which the vehicle is to be accelerated and a second situation in which the vehicle is to be decelerated, using the vehicle-related information sensed through the sensing unit 820.

For example, as illustrated in FIG. 11, the first situation in which the vehicle 100 is to be accelerated may include when a first signal associated with a traffic light is sensed (for example, when a turn-on of a green light G is detected), when the vehicle is driven at a speed slower than the lowest speed (e.g., 60 km/h) of a current driving road (e.g., when moving at 40 km/h), or the like.

The first situation in which the vehicle 100 is to be accelerated may refer to a situation in which the vehicle must be accelerated by pressing the accelerator pedal.

As another example, as illustrated in FIG. 11, the second situation in which the vehicle 100 is to be decelerated may include when a second signal associated with a traffic light is sensed (e.g., when a turn-on of a red light R is detected), when collision probability P against a front-side vehicle is a predetermined value or more, when a distance d between an object (e.g., a person, another vehicle, a building, an obstacle, etc.) and the vehicle 100 is a predetermined distance or less, and the like.

The second situation in which the vehicle is to be decelerated may further include when the vehicle is moving at a speed faster than a maximum speed (speed limit) of a current driving road.

The collision possibility against the front-side vehicle may be decided based on, for example, a relative speed between the vehicle 100 and the front-side vehicle, and a distance between the vehicle 100 and the front-side vehicle. For example, the collision probability against the front-side vehicle may be decided based on a time to collision (TTC).

The collision probability P increases when the TTC is short.

The collision possibility value P may be decided based on the TTC. The TTC may be decided based on the relative speed between the vehicle 100 and the front-side vehicle, and the distance between the vehicle 100 and the front-side vehicle.

The second situation in which the vehicle 100 is to be decelerated may refer to a situation in which the vehicle must be decelerated by pressing the brake pedal.

In addition, the present invention may be applied to a situation in which a vehicle is to be accelerated and a situation in which the vehicle is to be decelerated, which have not been listed above.

As described above, the present invention may decide the first situation in which the vehicle is to be accelerated and/or the second situation in which the vehicle is to be decelerated, based on the vehicle related information sensed through the sensing unit 820 (e.g., the first and second signals associated with the traffic light, the lowest/highest speed limit on the current driving road, the collision probability against the front-side vehicle, the detection of an object existing outside the vehicle, the distance between the object and the vehicle, etc.).

Thereafter, the processor 870 may output an alarm through the shoe 900, based on the position of the shoe 900 in the first situation or the second situation.

In the present invention, the shoe 900 for outputting the alarm will be described as an example of a right shoe that controls an accelerator pedal 1210 and a brake pedal 1220. However, the present invention is not limited to this, and the shoe 900 may also refer to at least one of a left shoe and a right shoe.

Figure 12:
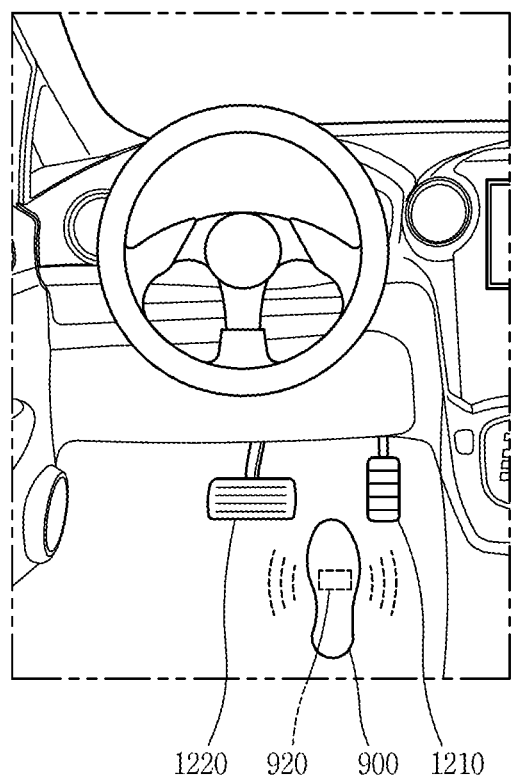

As illustrated in FIG. 12, the processor 870 may control the sensing unit 820 to sense the position of the shoe 900 when the first situation in which the vehicle is to be accelerated or the second situation in which the vehicle is to be decelerated is detected through the sensing unit 820.

The processor 870 may control the communication unit 810 so that the shoe 900 can output the alarm through the alarm unit 920 when the shoe 900 is not positioned on the accelerator pedal 1210 or the brake pedal 1220 of the vehicle in the first situation or the second situation.

Specifically, the processor 870 may output the alarm through the shoe 900 when the shoe 900 is not positioned on the accelerator pedal 1210 or the brake pedal 1220 of the vehicle in the first situation or the second situation.

Here, the state that the shoe is not positioned on the accelerator pedal 1210 or the brake pedal 1220 may refer to that the accelerator pedal 1210 or the brake pedal 1220 is not pressed or the shoe is not brought into contact with the accelerator pedal 1210 or the brake pedal 1220.

For example, the processor 870 may control the communication unit 810 so that the shoe 900 outputs an alarm when the shoe 900 is not positioned on the accelerator pedal 1210 in the first situation in which the vehicle is to be accelerated or when the shoe is not positioned on the brake pedal 1220 in the second situation in which the vehicle is to be decelerated.

Here, the case where the shoe 900 is not positioned on the accelerator pedal 1210 may include a case where the shoe 900 is positioned on the brake pedal 1220 or a case where the shoe 900 is brought into contact with a footboard of the driver's seat (i.e., when the shoe 900 is not brought into contact with any of the accelerator pedal 1210 and the brake pedal 1220).

The case where the shoe 900 is not located on the brake pedal 1220 may include a case where the shoe 900 is positioned on the accelerator pedal 1210 or a case where the shoe 900 is brought into contact with the footboard of the driver's seat (i.e., when the shoe 900 is not brought into contact with any of the accelerator pedal 1210 and the brake pedal 1220).

The processor 870 may transmit a control signal to the shoe 900 through the communication unit 810 so that the shoe outputs an alarm when the shoe 900 is not positioned on the accelerator pedal 1210 in the first situation in which the vehicle is to be accelerated or when the shoe is not positioned on the brake pedal 1220 in the second situation in which the vehicle is to be decelerated.

The controller 970 of the shoe 900 may control the alarm unit 920 of the shoe 900 to output an alarm, in response to the control signal received through the communication unit 910.

At this time, the processor 870 may control the communication unit 810 so that the shoe 900 outputs an alarm through different portions in the first situation in which the vehicle is to be accelerated and the second situation in which the vehicle is to be decelerated.

That is, the processor 870 may control the shoe to output an alarm through different portions of the shoe in the first and second situations.

As described above, the shoe 900 may include the first alarm portion 921 provided at a first position and the second alarm portion 922 provided at a second position different from the first position.

Here, the first position may be a right portion of the shoe where the accelerator pedal is located, and the second position may be a left portion of the shoe where the brake pedal is located.

The processor 870 may control the communication unit 810 so that the first alarm portion 921 of the shoe outputs an alarm in the first situation in which the vehicle is to be accelerated. In addition, the processor 870 may control the communication unit 810 so that the second alarm portion 922 of the shoe outputs an alarm in the second situation in which the vehicle is to be decelerated.

For example, as illustrated in (a) of FIG. 13, the processor 870 may sense the first situation in which the vehicle is to be accelerated through the sensing unit 820. In this instance, when the shoe 900 sensed through the sensing unit 820 is not positioned on the accelerator pedal 1210 (e.g., when the shoe 900 is positioned on the brake pedal 1220) in the first situation, the processor 870 may control the shoe (or the communication unit 810) to output an alarm through the first alarm portion 921 provided at the first position (the right portion) of the shoe 900 (the first alarm portion arranged at one side where the acceleration pedal is disposed).

Also, as illustrated in (b) of FIG. 13, the processor 870 may sense the second situation in which the vehicle is to be decelerated through the sensing unit 820. At this time, when the position of the shoe 900 sensed through the sensing unit 820 is not positioned on the brake pedal 1220 (for example, when the shoe 900 is positioned on the accelerator pedal 1210) in the second situation, the processor may control the shoe (or the communication unit 810) to output an alarm through the second alarm portion 922 provided at the second position (left portion) of the shoe 900 (the second alarm portion disposed at one side where the brake pedal is disposed).

On the other hand, the processor 870 may control the communication unit (or the shoe) so that the shoe 900 outputs an alarm in different manners in the first situation in which the vehicle is to be accelerated and in the second situation in which the vehicle is to be decelerated.

For example, the processor 870 may control the shoe 900 to output an alarm in a first manner (e.g., a manner of outputting vibration for a predetermined period) in the first situation in which the vehicle is to be accelerated.

As another example, the processor 870 may control the shoe (or the communication unit) to output an alarm in a second manner (e.g., a manner of continuously outputting vibration), which is different from the first manner, in the second situation in which the vehicle is to be decelerated.

In addition, the processor 870 may differently control a type of alarm (e.g., vibration and sound) output from the shoe or intensity of the alarm for each of the first and second situations.

Meanwhile, as illustrated in (a) of FIG. 13, when it is detected that the shoe 900 is positioned on (or presses) the accelerator pedal 1210 in the first situation in which the vehicle is to be accelerated while the alarm is output through the shoe 900, the processor 870 may control the communication unit 810 (or the shoe) to stop the output of the alarm.

Specifically, while the first alarm portion 921 outputs an alarm because the shoe 900 is not positioned on the accelerator pedal 1210 in the first situation, when it is detected that the shoe 900 is positioned on (or presses) the accelerator pedal 1210, the processor 870 may transmit a control signal for stopping the alarm output of the first alarm portion 921 to the shoe 900 through the communication unit 810.

The controller 970 of the shoe 900 may stop the alarm output of the first alarm portion 921 based on the control signal.

Also, as illustrated in (b) of FIG. 13, while the alarm is output through the shoe 900, when it is detected that the shoe 900 is positioned on (or presses) the brake pedal 1220 in the second situation in which the vehicle is to be decelerated, the processor 870 may control the communication unit 810 (or the shoe) to stop the output of the alarm.

Specifically, while the second alarm portion 922 outputs the alarm because the shoe 900 is not positioned on the brake pedal 1220 in the second situation, when it is detected that the shoe 900 is positioned on (or presses) the brake pedal 1220, the processor 870 may transmit a control signal for outputting the alarm output of the second alarm portion 922 to the shoe 900 through the communication unit 810.

The controller 970 of the shoe 900 may stop the alarm output of the second alarm portion 922 based on the control signal.

With the configuration, the present invention can provide a new user interface capable of outputting an alarm to guide a position where a driver's foot is to be positioned in an optimized manner for each of the first situation in which the vehicle is to be accelerated and the second situation in which the vehicle is to be decelerated.

Meanwhile, the processor 870 may decide a degree, to which the accelerator pedal or the brake pedal is to be pressed, for each situation. For example, the processor 870 may determine how much the accelerator pedal 1210 should be pressed in the first situation where the vehicle is to be accelerated. In addition, the processor 870 may determine how much the brake pedal 1220 should be pressed in the second situation in which the vehicle is to be decelerated.

For example, in the second situation in which the vehicle is to be decelerated, the processor 870 may determine a time to collision (TTC) based on a current speed of the vehicle and a distance from an object (e.g., another vehicle, a person, etc.) located at the front of the vehicle 100.

Thereafter, the processor 870 may determine (calculate) the degree to which the brake pedal 1220 should be pressed based on the TTC and a braking force of the vehicle.

The processor 870 may control the communication unit 810 so that the shoe 900 outputs an additional alarm when the accelerator pedal or brake pedal is pressed to a degree weaker than the determined degree.

Figure 14:
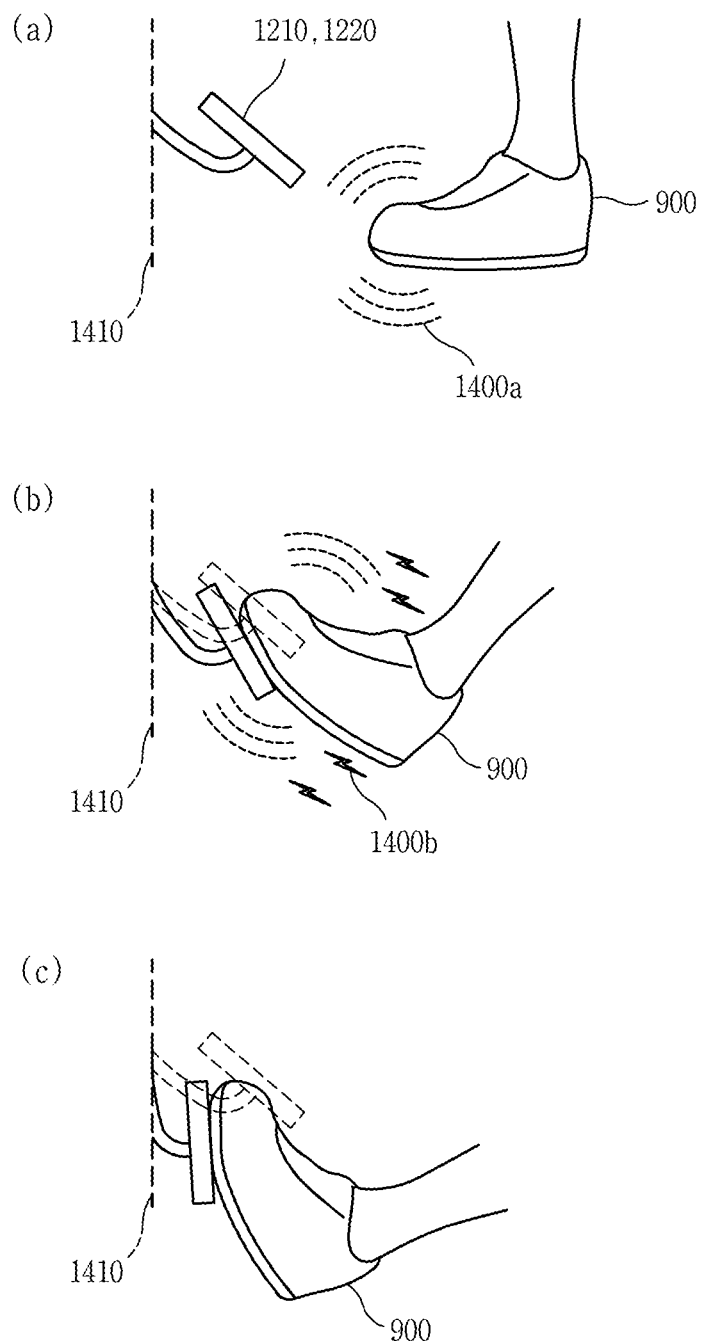

For example, as illustrated in (a) of FIG. 14, when the shoe is not positioned on the accelerator pedal in the first situation in which the vehicle is to be accelerated or the shoe is not positioned on the brake pedal in the second situation in which the vehicle is to be decelerated, the processor 870 may control the communication unit (or the shoe) so that the shoe 900 outputs a first alarm 1400a.

At this time, the processor 870 may determine a degree 1410 that the accelerator pedal should be pressed in the first situation in which the vehicle is to be accelerated, or a degree 1410 that the brake pedal should be pressed in the second situation in which the vehicle is to be decelerated.

At this time, when the accelerator pedal is pressed in the first situation in which the vehicle is to be accelerated but is pressed to a degree weaker than the degree 1410 to be pressed, as illustrated in (b) of FIG. 14, the shoe 900 may control the communication unit 810 (or the shoe 900) so that the shoe 900 outputs an additional alarm (a second alarm) 1400b.

Similarly, when the brake pedal is pressed in the second situation in which the vehicle is to be decelerated but is pressed to a degree weaker than the degree to be pressed, as illustrated in (b) of FIG. 14, the processor 870 may control the communication unit 810 (or the shoe 900) to output the additional alarm (or the second alarm) 1400b.

At this time, as illustrated in (b) of FIG. 14, the first alarm 1400a may also be output from the shoe 900 until the accelerator pedal 1210 or the brake pedal 1220 is pressed up to the degree 1410 to be pressed.

Also, as illustrated in FIG. 13, alternately, the first alarm 1400a may not be output based on that the shoe is positioned on the accelerator pedal in the first situation or the shoe is positioned on the brake pedal in the second situation.

The first alarm 1400a, as illustrated in FIGS. 9 to 13, may be an alarm output when the shoe 900 is not positioned on the accelerator pedal in the first situation or when the shoe 900 is not positioned on the brake pedal in the second situation.

On the other hand, the second alarm 1400*b* (additional alarm) is an alarm output when the accelerator pedal or the brake pedal is not pressed to the degree to be pressed in the first or second situation, and may be distinguished from the first alarm.

The first alarm 1400*a* and the second alarm 1400*b* may be different in the method of outputting the alarm, the type of the alarm, or the intensity of the alarm.

Thereafter, as illustrated in (c) of FIG. 14, the processor 870 may control the communication unit 810 (or the shoe 900) to stop the output of the additional alarm (the second alarm) when the accelerator pedal is pressed up to the degree 1410 to be pressed in the first situation in which the vehicle is to be accelerated or the brake pedal is pressed up to the degree 1410 to be pressed in the second situation in which the vehicle is to be decelerated.

At this time, when the first alarm 1400*a* is being output, the processor 870 may control the communication unit 810 (or the shoe 900) to stop the output of the first alarm.

With this configuration, the present invention can not only induce the driver's foot to be placed on the accelerator pedal or the brake pedal in the first situation in which the vehicle is to be accelerated and in the second situation in which the vehicle is to be decelerated, but also guide the degree to be pressed to the driver, thereby remarkably improving safety of driving.

Meanwhile, the present invention can provide a vehicle control device, capable of guiding a driver's foot to be placed on the accelerator pedal or brake pedal in the first situation in which the vehicle is to be accelerated and the second situation in which the vehicle is to be decelerated, and the shoe.

As described above, the shoe 900 of the present invention may be provided with a magnetic body 930. The magnetic body 930 may have an N pole or an S pole. Magnetism of the magnetic body 930 may be varied under the control of the controller 970.

On the other hand, the accelerator pedal 1210 and the brake pedal 1220 of the vehicle may be formed so as to change a direction of a magnetic field.

For example, each of the accelerator pedal 1210 and the brake pedal 1220 may be provided with a magnetic body having a direction of a magnetic field which is variable under the control of the processor 870.

Changing the direction of the magnetic field may refer to changing magnetism.

FIG. 15 illustrates one example in which the magnetic body provided in the shoe 900 is fixed to the N pole. Hereinafter, this example will be described.

The processor 870 may control the direction of the magnetic field of each of the accelerator pedal 1210 and the brake pedal 1220 so that the shoe 900 is positioned on the accelerator pedal 1210 in the first situation in which the vehicle is to be accelerated, and the shoe 900 is positioned on the brake pedal 1220 in the second situation in which the vehicle is to be decelerated.

The processor 870 may sense the magnetic field direction formed on the magnetic body 930 of the shoe 900 through the sensing unit 820 and decide (detect, determine) the magnetism of the magnetic body 930 of the shoe 900 based on the sensed magnetic field direction.

For example, the processor 870 may decide the magnetism of the magnetic body 930 to be an N pole or an S pole, based on the magnetic field direction of the magnetic body 930 of the shoe 900 sensed through the sensing unit 820 (N pole in FIG. 15).

Thereafter, the processor 870 may sense the first situation in which the vehicle is to be accelerated and the second situation in which the vehicle is to be decelerated, based on the vehicle related information through the sensing unit 820.

For example, as illustrated in (a) of FIG. 15, when the first situation in which the vehicle is to be accelerated is sensed through the sensing unit 820 and the magnetic body 930 of the shoe 900 is detected as the N pole, the processor 870 may control (decide) the magnetic field direction of the accelerator pedal 1210 and the brake pedal 1220 so that the magnetism of the accelerator pedal 1210 becomes the S pole and the magnetism of the brake pedal 1220 becomes the N pole.

In this case, since the magnetic body 930 of the shoe 900 has the N pole and the accelerator pedal 1210 has the S pole, an attractive force is applied between the shoe 900 (the magnetic body 930 of the shoe) and the accelerator pedal 1210.

On the other hand, since the magnetic body 930 of the shoe 900 has the N pole and the brake pedal 1220 has the N pole, a repulsive force R is applied between the shoe 900 (the magnetic body 930 of the shoe) and the brake pedal 1220.

Accordingly, the present invention can provide a vehicle control device capable of physically inducing a driver's foot to be placed on an accelerator pedal in a first situation in which the vehicle is to be accelerated, in a manner that the processor 870 decides a magnetic field direction of the accelerator pedal such that a magnetism (e.g., S pole) opposite to a magnetism (e.g., N pole) formed on the shoe is formed on the accelerator pedal and causes the brake pedal to form the same magnetism (e.g., N pole) as the magnetism (e.g., N pole) formed on the shoe in the first situation.

As another example, as illustrated in (b) of FIG. 15, when the second situation in which the vehicle is to be decelerated is sensed through the sensing unit 820 and the magnetic body 930 of the shoe 900 is detected as the N pole, the processor 870 may control (decide) the magnetic field directions of the accelerator pedal 1210 and the brake pedal 1220 so that the magnetism of the accelerator pedal 1210 becomes the N pole and the magnetism of the brake pedal 1220 becomes the S pole.

In this case, since the magnetic body 930 of the shoe 900 has the N pole and the accelerator pedal 1210 has the N pole, a repulsive force R is applied between the shoe 900 (the magnetic body 930 of the shoe) and the accelerator pedal 1210.

On the other hand, since the magnetic body 930 of the shoe 900 has the N pole and the brake pedal 1220 has the S pole, an attractive force A is applied between the shoe 900 (the magnetic body 930 of the shoe) and the brake pedal 1220.

Accordingly, the present invention can provide a vehicle control device capable of physically inducing a driver's foot to be placed on a brake pedal in a second situation in which the vehicle is to be decelerated, in a manner that the processor 870 decides a magnetic field direction of the accelerator pedal such that the same magnetism (e.g., N pole) as a magnetism (e.g., N pole) formed on the shoe is formed on the accelerator pedal and causes the brake pedal to form a magnetism (e.g., S pole) opposite to the magnetism (e.g., N pole) formed on the shoe in the second situation.

Meanwhile, the processor 870 of the vehicle control device 800 related to the present invention may perform a preset function based on a pedal being pressed by the shoe 900 sensed through the sensing unit 820 and a traveling state (driving state) of the vehicle.

Figure 16:
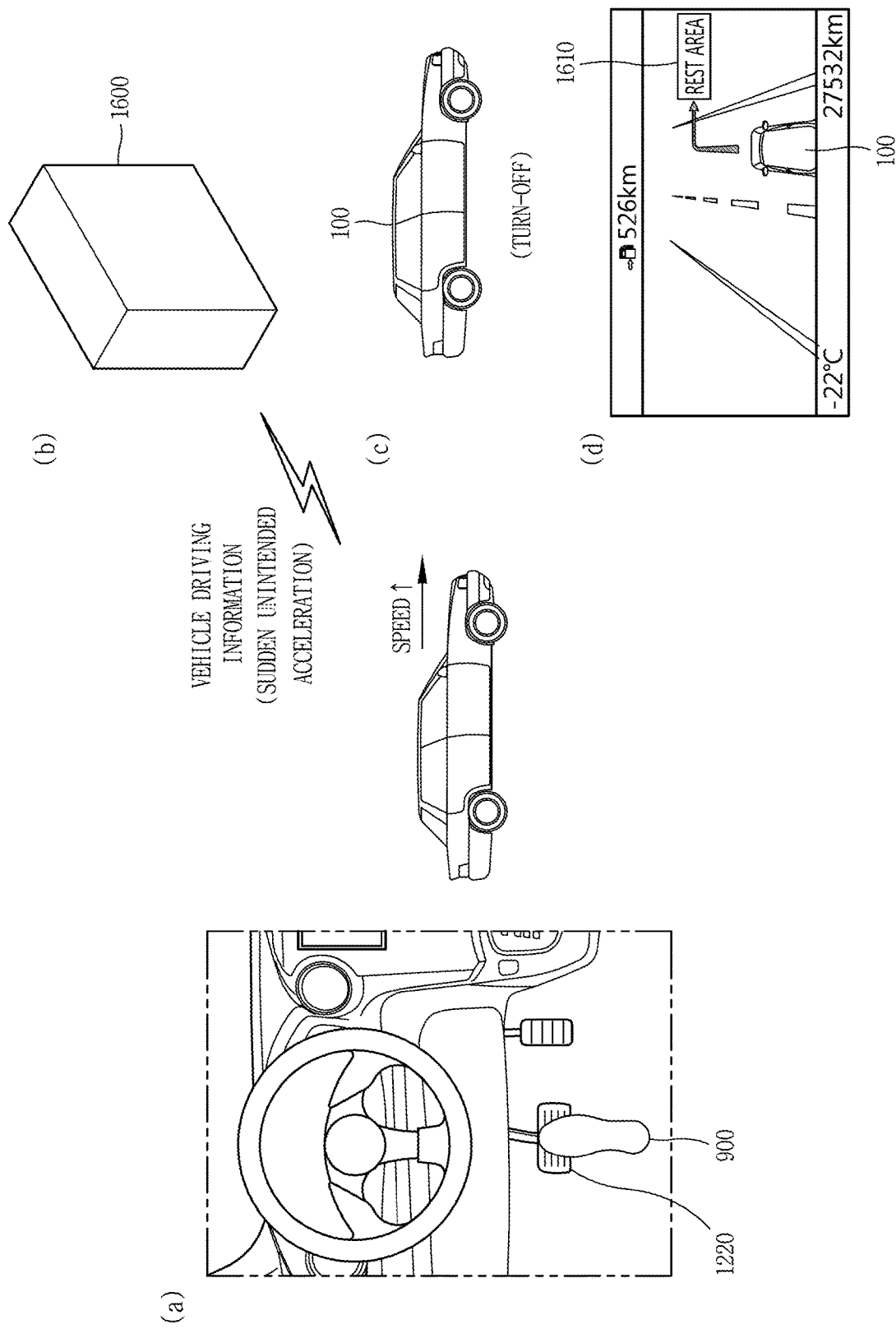

In one example, as illustrated in (a) of FIG. 16, when the shoe 900 is currently pressing the brake pedal 1220 but the vehicle 100 is accelerated, the processor 870, as illustrated in (b) of FIG. 16, may transmit driving information (traveling information) related to the vehicle 100 to an external device 1600 (e.g., an external server, a mobile terminal, the Internet, etc.) through the communication unit 810.

That is, the situation that the shoe 900 is pressing the brake pedal 1220 but the vehicle 100 is accelerated may refer to an occurrence of a sudden unintended acceleration in the vehicle. At this time, the driving information related to the vehicle may include information related to a degree to which the brake pedal is pressed, speed/acceleration of the vehicle in a pressed state of the brake pedal, and the like.

As another example, when the shoe 900 is pressing the brake pedal 1220 but the vehicle 100 is accelerated, the processor 870 may turn off the vehicle as illustrated in (c) of FIG. 16, or control the vehicle to travel in an autonomous driving mode up to a preset place 1610 as illustrated in (d) of FIG. 16.

The processor 870 may turn off the vehicle to stop the engine of the vehicle when the shoe 900 is pressing the brake pedal 1220 but the vehicle 100 is accelerated.

When the shoe 900 is pressing the brake pedal 1220 but the vehicle 100 is accelerated, the processor 870 may switch a manual driving mode to the autonomous driving mode, such that the vehicle is autonomously driven up to a preset place (e.g., a rest area, a gas station, a vacant lot, a shoulder road, etc.) closest to a current point of the vehicle among a plurality of preset places.

With such a configuration, the present invention can provide a vehicle control device, capable of determining a sudden unintended acceleration of the vehicle based on a type of a pedal pressed by a shoe and a driving state of the vehicle, and coping with the sudden intended acceleration in an optimized manner.

As described above, the processor 870 of the vehicle control device 800 related to the present invention can drive the vehicle in the manual driving mode or in the autonomous driving mode.

The vehicle 100 related to the present invention can operate in any one of a manual driving mode and an autonomous driving mode. Specifically, the processor 870 may drive the vehicle 100 in any one of the manual driving mode and the autonomous driving mode.

The driving modes of the vehicle 100 may include the manual driving mode and the autonomous driving mode.

The autonomous driving mode (or the automatic driving mode) may refer to a mode in which the vehicle travels by itself based on a preset algorithm, regardless of the driver's driving operation. For example, the autonomous driving mode may be a mode in which the vehicle can travel on its own within a predetermined section or at least a part of a section up to a destination set by a user.

In the autonomous driving mode, for example, the vehicle may be driven according to a preset algorithm to perform autonomous driving, without varying steering or speed of the vehicle, even without a driver's driving operation.

Since the manual driving mode and the autonomous driving mode belong to a general technical field, a more detailed description will be omitted.

The processor 870 of the vehicle control device 800 related to the present invention can move the drivers seat backward when the vehicle enters the autonomous driving mode. This is to provide a larger space for the driver sitting in the drivers seat.

In this case, the driver's foot may not reach the accelerator pedal 1210 or the brake pedal 1220.

The vehicle control device 800 of the present invention can accelerate or decelerate the vehicle, in response to the operation of the accelerator pedal 1210 or the brake pedal 1220 when a situation in which an emergency acceleration or emergency braking is required occurs even in the autonomous driving mode.

At this time, the present invention may provide a control method capable of manually accelerating or decelerating a vehicle even when a driver's foot does not reach an accelerator pedal or a brake pedal, which results from that a driver's seat has been moved backward in an autonomous driving mode.

As illustrated in (a) of FIG. 17, a footboard 1700 of a drivers seat of the vehicle 100 according to the present invention may be provided with a first pad 1710 corresponding to the accelerator pedal 1210 and a second pad 1720 corresponding to the brake pedal 1220.

The processor 870 may control driving (running, traveling) of the vehicle based on whether the shoe 900 presses the first pad 1710 or the second pad 1720.

For example, the processor 870 may accelerate the vehicle 100 when the shoe 900 presses the first pad 1710. The processor 870 may also decelerate the vehicle 100 when the shoe 900 presses the second pad 1710.

Whether or not the shoe 900 has pressed the first pad 1710 or the second pad 1720 may be detected by the sensing unit 820 or determined (detected) based on an electric signal received from the first or second pad 1710 or 1720.

Meanwhile, the first pad 1710 and the second pad 1720 may be activated when the driving mode of the vehicle 100 is the autonomous driving mode. That is, the first pad 1710 and the second pad 1720 may be in an inactive state when the driving mode of the vehicle 100 is the manual driving mode.

The processor 870 may also switch the first pad 1710 and the second pad 1720 from the inactive state into an active state when the driving mode of the vehicle 100 is switched into the autonomous driving mode and the driver's seat is moved backward by a predetermined distance or more.

In addition, in a state that the driving mode of the vehicle is the autonomous driving mode and the driver's seat has been moved backward by a predetermined distance or more, the processor 870 may activate the first pad 1710 and the second pad 1720, in response to a detection of the first situation in which the vehicle is to be accelerated or the second situation in which the vehicle is to be decelerated.

The processor 870 may also activate the first pad 1710 and the second pad 1720 based on a detection of a preset movement (motion) of the shoe. For example, the preset movement may be a movement that the shoe 900 taps the footboard 1700 of the driver's seat by a preset number of times within a preset time, a movement that the shoe 900 taps a specific area of the footboard 1700 of the driver's seat, a movement that the shoe 900 presses the first pad 1710 and/or the second pad 1720 for a predetermined time or more, a movement that the shoe 900 alternately presses the first pad 1710 and the second pad 1720 by a predetermined number of times or more.

Whether or not the shoe 900 is moved in the preset movement may be sensed through the sensing unit 820 or in response to information sensed by the sensing unit 940 of the shoe 900 being received through the communication unit 810.

In addition, the first pad 1710 and the second pad 1720 may be activated based on a user input through the user input unit.

On the other hand, when the driving mode of the vehicle is the autonomous driving mode, the processor 870 may control driving of the vehicle based on that the shoe presses the first pad or the second pad, regardless of the situation in which the vehicle is to be accelerated or decelerated.

In detail, the processor 870 may accelerate the vehicle when the first pad 1710 is pressed by the shoe 900 and decelerate the vehicle when the second pad 1720 is pressed by the shoe 900, in the autonomous driving mode of the vehicle, regardless of the first situation in which the vehicle is to be accelerated or the second situation in which the vehicle is to be decelerated.

As another example, the processor 870 may control driving of the vehicle, in response to the shoe pressing the first pad or the second pad, in a state where the vehicle is in the autonomous driving mode and the driver's seat has been moved by a predetermined distance or more, regardless of the first situation in which the vehicle is to be accelerated or the second situation in which the vehicle is to be decelerated.

With this configuration, the present invention can provide a new vehicle control device capable of manually driving the vehicle more immediately in the autonomous driving mode.

Meanwhile, the processor 870 may control driving of the vehicle based on a position of the shoe in a state where the first pad 1710 and the second pad 1720 are not provided.

That is, according to the present invention, even if the separate physical structure such as the first pad 1710 and the second pad 1720 are not provided on the footboard 1700 of the driver's seat, the position of the shoe 900 may be sensed and the vehicle may be manually accelerated or decelerated in the autonomous driving mode based on the sensed position of the shoe 900.

For example, the processor 870, as illustrated in (b) of FIG. 17, may sense the position of the shoe 900 through the sensing unit 820. For example, the processor 870 may sense through the sensing unit 820 that the shoe 900 is brought into contact with (located on) a first position 1730 adjacent to the accelerator pedal 1210 or a second position 1740 adjacent to the brake pedal 1220.

The processor 870 may accelerate the vehicle 100 when the shoe 900 is brought into contact with the first position 1730 adjacent to the accelerator pedal 1210 while the vehicle 100 is in the autonomous driving mode.

The processor 870 may also decelerate the vehicle 100 when the shoe 900 is brought into contact with the second position 1740 adjacent to the brake pedal 1220 while the vehicle 100 is in the autonomous driving mode.

The first position and the second position may refer to different portions of the footboard 1700 of the driver's seat, and may be understood as a first portion and a second portion (or first and second regions).

The first position 1730 may refer to a portion of the footboard 1700 of the driver's seat, which is located at the rear (on the driver's side) by a predetermined distance from the position of the accelerator pedal 1210, and a size of the first position may be preset.

The second position 1740 may refer to a portion of the footboard 1700 of the driver's seat, which is located at the rear (on the driver's side) by a predetermined distance from the position of the brake pedal 1220. In addition, the size of the second position may be preset.

The first position and the second position are preferably separated from each other in a non-overlapping manner.

Acceleration or deceleration of the vehicle based on the contact of the shoe with the first position or the second position may be performed under the control of the processor 870 when the vehicle is in the autonomous driving mode or the first situation in which the vehicle is to be accelerated or the second situation in which the vehicle is to be decelerated is detected through the sensing unit 820 in the autonomous driving mode.

That is, the processor 870 may accelerate or decelerate the vehicle according to a contact position (the first or second position) of the shoe, based on at least one of cases in which the vehicle is in the autonomous driving mode, the first situation in which the vehicle is to be accelerated or the second situation in which the vehicle is to be decelerated is detected through the sensing unit 820 in the autonomous driving mode, and the driver's seat has been moved backward by a predetermined distance.

The processor 870 may also activate the first position 1730 and the second position 1740 based on a preset movement of the shoe.

That is, the processor 870 may accelerate the vehicle when the shoe 900 is brought into contact with the first position 1730 after the shoe 900 makes the preset movement, and decelerate the vehicle when the shoe 900 is brought into contact with the second position 1740 after the shoe 900 moves the preset movement.

For example, the preset movement may be a movement that the shoe 900 taps the footboard 1700 of the driver's seat by a preset number of times within a preset time, a movement the shoe 900 taps a specific area of the footboard 1700, a movement that the shoe 900 contacts (or presses) the first position 1730 and/or the second position 1740 for a predetermined time or more, and a movement that the shoe 900 alternately contacts (presses) the first position 1730 and the second position 1740 by a predetermined number of times or more.

Whether or not the shoe 900 is moved in the preset movement may be sensed through the sensing unit 820 or in response to information sensed by the sensing unit 940 of the shoe 900 being received through the communication unit 810.

Also, the first location 1730 and the second location 1740 may be activated based on a user input through the user input unit.

On the other hand, the processor 870 may control driving of the vehicle, in response to the shoe pressing the first position 1730 or the second position 1740, regardless of the situation in which the vehicle is to be accelerated or decelerated, when the driving mode of the vehicle is in the autonomous driving mode.

Specifically, the processor 870 may accelerate the vehicle when the shoe is brought into contact with the first position 1730 adjacent to the accelerator pedal, and decelerate the vehicle when the shoe is brought into contact with the second position 1740 adjacent to the brake pedal, regardless of the first situation in which the vehicle is to be accelerated or the second situation in which the vehicle is to be decelerated, when the vehicle is in the autonomous driving mode.

As another example, when the vehicle is in the autonomous driving mode and the driver seat has been moved backward by a predetermined distance or more, the processor 870 may control driving of the vehicle, in response to the shoe pressing the first position 1730 or the second position 1740, regardless of the first situation in which the vehicle is to be accelerated or the second situation in which the vehicle is to be decelerated.

With this configuration, the present invention can provide a new vehicle control device capable of manually driving the vehicle more immediately in the autonomous driving mode.

The processor 870 of the vehicle control device 800 of the present invention may manually accelerate or decelerate the vehicle in the autonomous driving mode according to an area of the shoe which contacts the footboard 1700 of the driver's seat.

For example, as illustrated in FIG. 18, the processor 870 may determine (detect, decide) which portion of the shoe 900 has been brought into contact with the footboard 1700 of the driver's seat.

The processor 870, as illustrated in (a) of FIG. 18, may accelerate the vehicle 100 when a first portion 1800a (e.g., a front portion) of the shoe 900 is brought into contact with the footboard 1700 of the driver's seat.

Also, as illustrated in (b) of FIG. 18, the processor 870 may decelerate the vehicle when a second portion 1800b (e.g., a rear portion of the shoe) different from the first portion is brought into contact with the footboard 1700 of the driver's seat.

At this time, the processor 870 may differently control intensity (degree) of acceleration or deceleration of the vehicle 100 in proportion to an area (or a size of the area) of the shoe 900 brought into contact with the footboard of the driver's seat.

Specifically, the processor 870 may accelerate the vehicle more quickly as the contact area of the first portion 1800a of the shoe 900 is greater.

In addition, the processor 870 may decelerate the vehicle more quickly as the contact area of the second portion 1800b of the shoe 900 is greater.

In addition, the processor 870 may differently control intensity (degree) of acceleration or deceleration of the vehicle 100 in proportion to intensity (strength) of the shoe 900 pressing the footboard of the driver's seat.

Specifically, the processor 870 may accelerate or decelerate the vehicle more quickly as a degree that the first portion 1800a of the shoe 900 or the second portion 1800b of the shoe 900 presses the footboard of the driver's seat is stronger.

Alternatively, the processor 870 may accelerate or decelerate the vehicle more slowly as a degree that the first portion 1800a of the shoe 900 or the second portion 1800b of the shoe 900 presses the footboard of the driver's seat is weaker.

That is, the processor 870 may accelerate or decelerate the vehicle in proportion to the area (or the size of the area) of the shoe 900 brought into contact with the footboard 1700 of the driver's seat or the strength (intensity) with which the shoe presses the footboard of the driver's seat.

The contact portion and the contact area of the shoe 900 with the footboard of the driver's seat and the degree of the shoe 900 pressing the footboard 1700 may be sensed through the sensing unit 820 of the vehicle control device 800 or through the sensing unit 940 of the shoe 900.

The processor 870 may accelerate or decelerate the vehicle according to the contact portion of the shoe (e.g., the first or second portion of the shoe) with the footboard of the driver's seat, based on at least one of cases where the vehicle is in the autonomous driving mode or the first situation in which the vehicle is to be accelerated or the second situation in which the vehicle is to be decelerated is detected through the sensing unit 820, or the driver's seat has been moved backward by a predetermined distance.

The processor 870 may also control driving of the vehicle (or at least one of the first portion 1800a and the second portion 1800b of the shoe 900 may be activated) based on a contacted portion of the shoe 900, when the shoe 900 makes a preset movement.

That is, the processor 870 may accelerate the vehicle when the first portion 1800a of the shoe is brought into contact with (or presses) the footboard 1700 of the driver's seat after the shoe 900 makes a preset movement, and decelerate the vehicle when the second portion 1800b is brought into contact with (or presses) the footboard 1700 of the driver's seat after the shoe 900 makes a preset movement.

For example, the preset movement may be a movement that the shoe 900 taps the footboard 1700 of the driver's seat by a preset number of times within a preset time, a movement that the shoe 900 taps a specific area of the footboard 1700 of the driver's seat, a movement of contacting (or pressing) the first portion 1800a and/or the second portion 1800b of the shoe for a predetermined time or more, and a movement that the first portion 1800a and the second portion 1800b of the shoe are alternately brought into contact with the footboard 1700 of the driver's seat by a predetermined number of times or more.

Whether or not the shoe 900 makes the preset movement may be sensed through the sensing unit 820 or in response to information sensed by the sensing unit 940 of the shoe 900 being received through the communication unit 810.

Also, the first portion 1800a and the second portion 1800b of the shoe 900 may be activated based on a user input through the user input unit.

On the other hand, the processor 870 may control driving of the vehicle based on the fact that the first portion 1800a or the second portion 1800b of the shoe is brought into contact with (or presses) the footboard 1700 of the driver's seat, when the driving mode of the vehicle is the autonomous driving model.

Specifically, in the autonomous driving mode of the vehicle, the processor 870 may accelerate the vehicle when the first portion of the shoe is brought into contact with the footboard of the driver's seat, and decelerate the vehicle when the second portion different from the first portion is brought into contact with the footboard of the driver's seat, regardless of the first situation in which the vehicle is to be accelerated or the second situation in which the vehicle is to be decelerated.

As another example, the processor 870 may control driving of the vehicle, in response to the first portion 1800a or the second portion 1800b of the shoe being brought into contact with (or pressing) the footboard 1700 of the driver's seat, regardless of the first situation in which the vehicle is to be accelerated or the second situation in which the vehicle is to be decelerated, when the vehicle is in the autonomous driving mode and the driver's seat has been moved backward by a predetermined distance.

With this configuration, the present invention can provide a new vehicle control device capable of manually driving the vehicle more immediately in the autonomous driving mode.

On the other hand, when the processor 870 enters a state in which the mode is to be switched from the autonomous driving mode to the manual driving mode, as illustrated in (a) of FIG. 19, the processor 870 may control the communication unit 810 (or the shoe 900) so that the shoe 900 outputs an alarm.

For example, the state in which the mode is to be switched from the autonomous driving mode to the manual driving mode may include a case where a user input is received, or a case where a vehicle has entered a road to be driven only in the manual driving mode.

The processor 870 may output the alarm through the shoe 900 until the shoe 900 is positioned on (presses, or contacts) the accelerator pedal 1210 or the brake pedal 1220, although entering the manual driving mode.

Afterwards, as illustrated in (b) of FIG. 19, when the shoe 900 is positioned on (contacts or presses) the accelerator pedal 1210 or the brake pedal 1220, the processor 870 may control the communication unit 810 (or the shoe 900) to stop the output of the alarm.

With this configuration, the present invention can provide a new user interface capable of manually accelerating or decelerating the vehicle in various ways even when the vehicle is in the autonomous driving mode or when the driver's seat has been moved backward by a predetermined distance in the autonomous driving mode.

The present invention may also provide a vehicle control device and a shoe capable of effectively providing feedback to a driver by outputting an alarm through the shoe until the shoe is positioned on a pedal when a driving mode is switched from an autonomous driving mode to a manual driving mode.

Meanwhile, the present invention may provide a control method capable of providing notification (feedback) to a driver through a shoe in various ways. Hereinafter, various embodiments of the present invention will be described with reference to the accompanying drawings.

Figure 20:
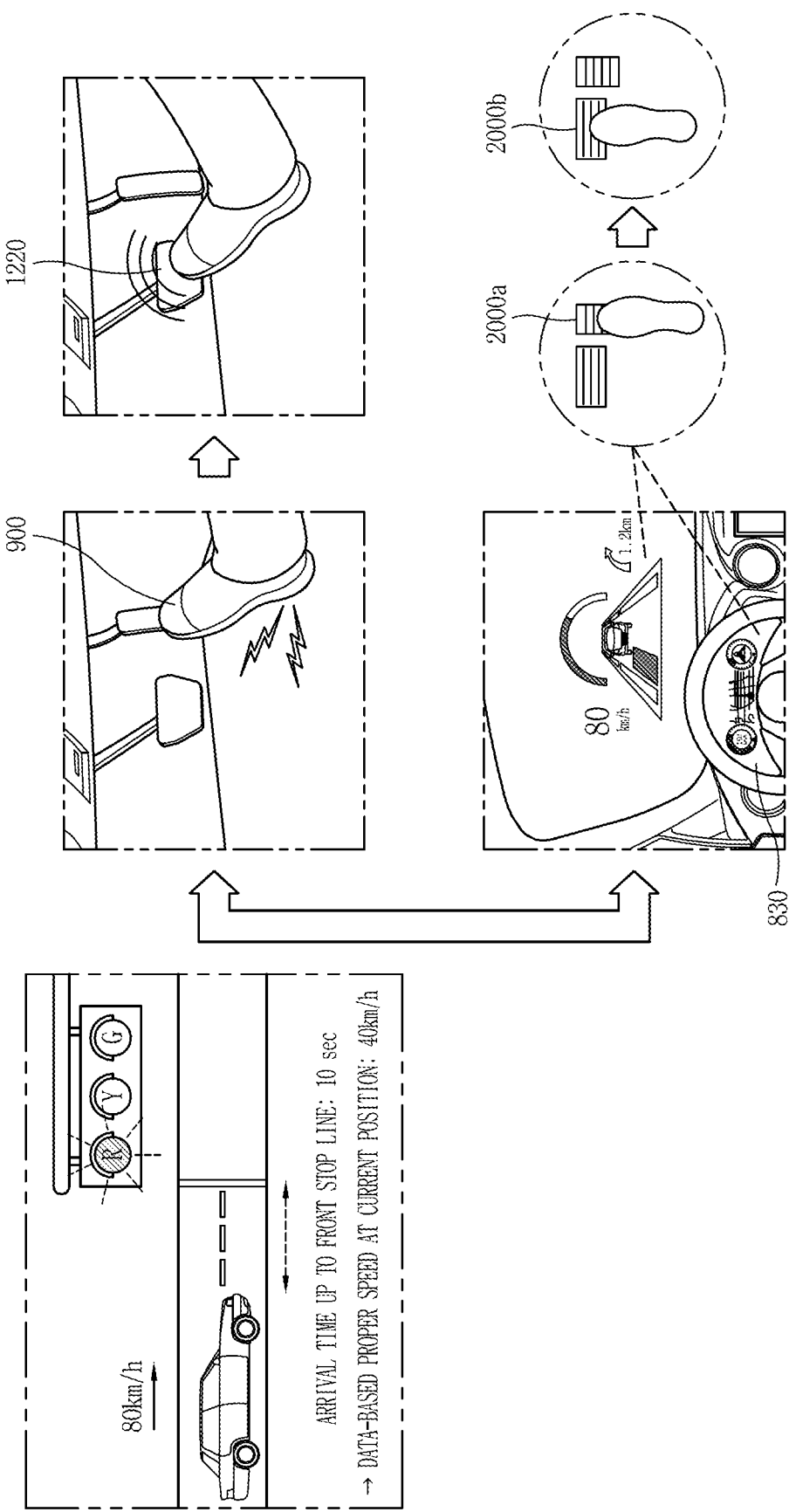

First, referring to FIG. 20, the processor 870 of the vehicle control device 800 of the present invention may sense a first situation in which the vehicle is to be accelerated or a second situation in which the vehicle is to be decelerated through the sensing unit 820.

For example, when a second signal (e.g., red light) associated with a traffic light located ahead is sensed through the sensing unit 820, the processor 870 may calculate an arrival time taken by the vehicle to reach a stop line located near the traffic light, on the basis of a distance between the stop line and the vehicle, and a speed of the vehicle.

Further, when the arrival time is too short (i.e., when the speed of the vehicle is too fast or the arrival time is shorter than an arrival time according to a reference condition), the processor 870 may calculate an appropriate time required for the vehicle to reach the stop line at the arrival time according to the reference condition.

In this case, the processor 870 may determine that the vehicle is in the second situation in which the vehicle is to be decelerated.

The processor 870 may determine whether the shoe 900 is positioned on the brake pedal 1220 through the sensing unit 820 when the second situation in which the vehicle is to be decelerated is detected.

Thereafter, the processor 870 may output an alarm through the shoe 900, as illustrated in FIG. 20, when the shoe 900 is not positioned on the brake pedal 1220 in the second situation.

The processor 870 may then stop the output of the alarm when it is sensed that the shoe 900 is positioned on (contacts or presses) the brake pedal 1220 while the alarm is output.

On the other hand, the processor 870 may decide a degree to press the brake pedal 1220 to reach the stop line at the arrival time according to the reference condition. The processor 870 may then output an additional alarm through the shoe 900 when the brake pedal 1220 is not pressed to the decided degree even though the shoe 900 is positioned on the brake pedal 1220.

The processor 870 may output a graphic object on the display unit 830 when the shoe 900 is not positioned on the accelerator pedal 1210 in the first situation in which the vehicle is to be accelerated or the shoe 900 is not positioned on the brake pedal 1220 in the second situation in which the vehicle is to be decelerated.

The graphic object may include at least one of a graphic object 2000a indicating a current position of the shoe 900 or a graphic object 2000b guiding the pedal where the shoe 900 should be positioned.

With such a configuration, the present invention can notify which pedal the driver's foot should be positioned in an optimized manner through the alarm of the shoe or the display unit.

Referring to FIG. 21, the vehicle control device 800 of the present vehicle 100 may sense a sudden deceleration of a front vehicle 2100. For example, the processor 870 may sense that the front vehicle 2100 has been suddenly decelerated (suddenly stopped) when a relative speed between the vehicle 100 and the front vehicle 2100 increases by a predetermined value or more based on information related to the vehicle sensed through the sensing unit 820.

When driving information (sudden stop information) is received from the front vehicle 2100 through the communication unit 810 due to the sudden deceleration of the front vehicle 2100, the processor 870 may also sense a sudden deceleration of the front vehicle 2100 based on the received driving information.

In this case, as illustrated in (a) of FIG. 21, the processor 870 may decide that the vehicle is in the second situation in which the vehicle is to be decelerated when the front vehicle 2100 performs the sudden deceleration.

In this case, similarly, as illustrated in (b) of FIG. 21, the processor 870 may sense a position of the shoe 900, and output an alarm through the shoe 900 when the shoe 900 is not positioned on the brake pedal 1220 (or is positioned on the accelerator pedal 1210).

The processor 870 may output a warning message through the display unit 820 when the shoe 900 is not positioned on the brake pedal 1220.

Referring to (a) of FIG. 22, the processor 870 may sense a case where a driving speed of the vehicle is not reduced even though a second signal (e.g., red light) associated with a traffic light (e.g., a red light) sensed through the sensing unit 820 has been detected.

That is, the processor 870 may detect a case where the second signal associated with the traffic light has been detected and the shoe 900 does not press the brake pedal 1220.

In this case, as illustrated in (b) of FIG. 22, the processor 870 may decelerate the vehicle by activating an Autonomous Emergency Brake (AEB) function among Advanced Driver Assistance System (ADAS) functions.

At this time, when a function related to the driving of the vehicle, such as the AEB function among the ADAS functions, is performed, the processor 870 may output an alarm of the shoe 900 so that the shoe 900 is positioned at a place for performing the performed driving of the vehicle (e.g., brake).

For example, when the vehicle is decelerated by the AEB function, the processor 870 may control the communication unit 810 (or the shoe 900) so that the shoe 900 outputs an alarm until the shoe 900 is positioned on the brake pedal 1220.

On the other hand, as illustrated in (a) of FIG. 23, the processor 870 may detect a case where the vehicle is to be accelerated, in a state where a second signal associated with a traffic light is detected. For example, the processor 870 may sense a pressed state of the accelerator pedal 1210, not the brake pedal 1220, in the second situation in which the vehicle is to be decelerated as the second signal associated with the traffic light is detected.

In this case, as illustrated in (b) of FIG. 23, the processor 870 may output an alarm through the shoe until the shoe 900 is positioned on (presses) the brake pedal 1220.

Further, the case where the accelerator pedal 1210 other than the brake pedal 1220 is pressed in the second situation in which the vehicle is to be decelerated may be a case where the driver is confused to cause a mistake in manipulation of the vehicle. In this case, the processor 870 may not accelerate the vehicle when the accelerator pedal 1210 other than the brake pedal 1220 is pressed in the second situation in which the vehicle is to be decelerated. That is, the processor 870 may not accelerate the vehicle (i.e., ignore the input of the accelerator pedal) when the accelerator pedal is pressed in the second situation in which the vehicle is to be decelerated, and may not decelerate the vehicle (i.e., ignore the input of the brake pedal) when the brake pedal is pressed in the first situation in which the vehicle is to be accelerated.

Also, as illustrated in (c) of FIG. 23, the processor 870 may output an alarm through the shoe so that the shoe 900 can be positioned on (press) the brake pedal 1220 when the accelerator pedal 1210 other than the brake pedal 1220 is pressed in the second situation in which the vehicle is to be decelerated.

Similarly, when the brake pedal 1220 other than the accelerator pedal 1210 is pressed in the first situation in which the vehicle is to be accelerated, the processor 870 may output an alarm through the shoe so that the shoe 900 can be positioned on (press) the accelerator pedal 1210.

Meanwhile, the shoe 900 of the present invention may be configured so that a shoelace (or a top side of the foot) can be tightened or loosened. Tightening or loosening the shoelace may be performed by the control of the controller 970 or the alarm unit 920 of the shoe 900.

The alarm of the shoe described in this specification may include tightening the shoelace, loosening the shoelace, repeatedly tightening or loosening the shoelace, or the like.

Meanwhile, the present invention may provide a control method of tightening a shoelace when the driver needs to be vigilant according to a driving state of the vehicle, and loosening the shoelace when the driver is allowed to drive the vehicle comfortably.

Figure 24:
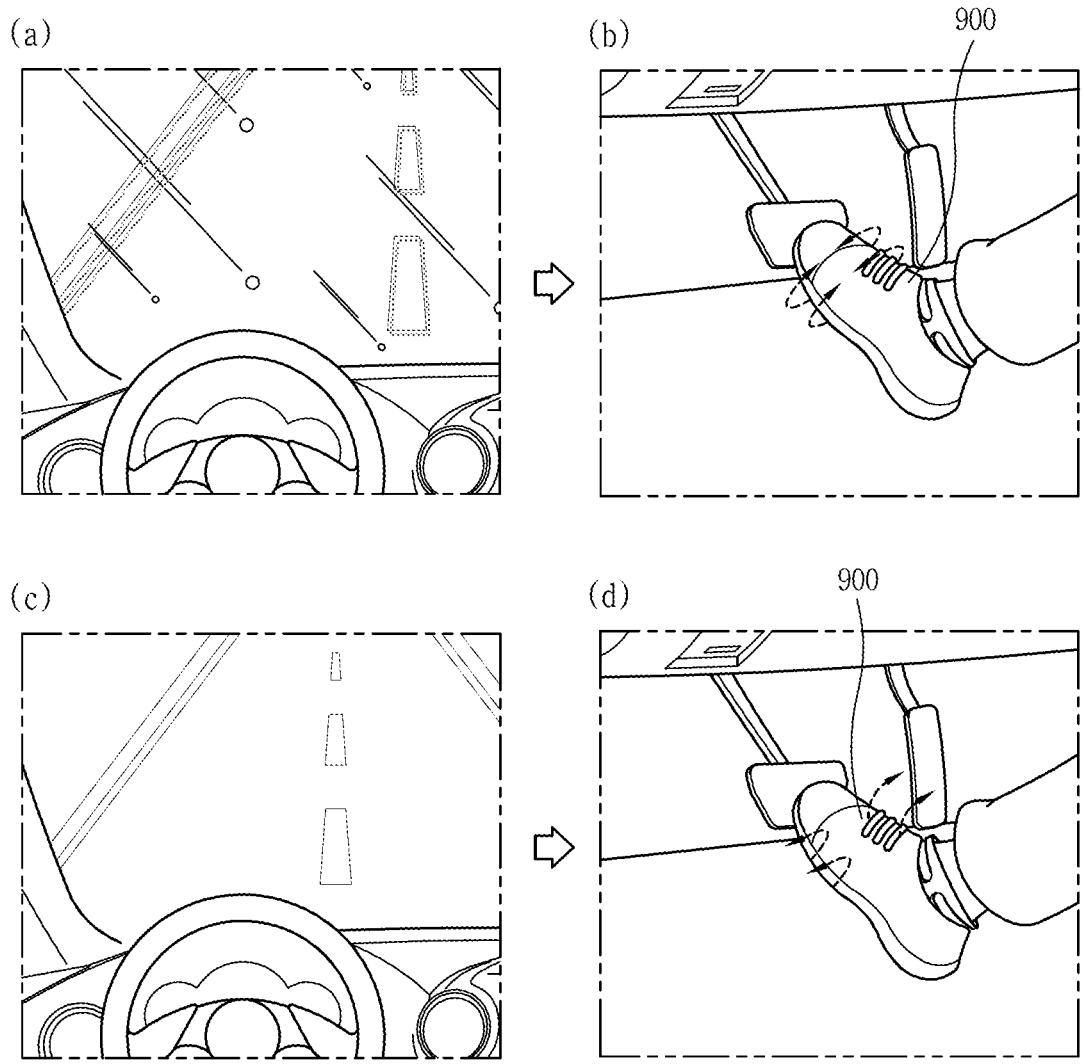

For example, as illustrated in FIG. 24, the processor 870 may sense whether a surrounding environment of the vehicle satisfies a preset first condition through the sensing unit 820.

Here, the preset first condition may refer to a condition that the driver should be vigilant. For example, as illustrated in (a) of FIG. 24, the preset first condition may include whether the surrounding environment of the vehicle is in a snowy state, in a rainy state, is that snow, water, or leaves are filed on a road, in a foggy state, and the like.

When the surrounding environment of the vehicle satisfies the preset first condition, as illustrated in (b) of FIG. 24, the processor 870 may control the communication unit 810 (or the shoe 900) so as to tighten the shoelace.

Specifically, the processor 870 may sense through the sensing unit 820 whether the surrounding environment of the vehicle satisfies a preset second condition.

Here, the preset second condition may refer to a condition that the driver can comfortably drive the vehicle. For example, as illustrated in (c) of FIG. 24, the preset second condition may include whether the vehicle is traveling on a highway, whether a traffic condition of a currently-traveling road of the vehicle is smooth, and the like.

When the surrounding environment of the vehicle satisfies the preset second condition, the processor 870 may control the communication unit 810 (or the shoe 900) so as to release the shoelace, as illustrated in (d) of FIG. 24.

On the other hand, the processor 870 may control the shoe variously according to the driver's status.

For example, the processor 870 may determine whether the driver's status satisfies a preset condition through the sensing unit 820.

Here, the preset condition may refer to a condition that the driver cannot concentrate on driving. For example, as illustrated in (a) of FIG. 25, the preset condition may include a case where a drowsiness level of the driver is a predetermined value or more, a case where the driver's gaze is directed to the front, a case where the driver suddenly falls (hypoglycemic shock, etc.), and the like.

In this case, as illustrated in (b) of FIG. 25, the processor 870 may control the communication unit 810 (or the shoe 900) so that the shoelace is tightened on the basis of the fact that the driver's status satisfies the preset condition.

Also, as illustrated in (c) of FIG. 25, the processor 870 may control the communication unit 810 (or the shoe 900) so that the shoe 900 outputs an alarm based on the fact that the driver's status satisfies the preset condition.

Meanwhile, the present invention may perform various functions according to a distance between the vehicle and the shoe.

The processor 870 may sense that the shoe 900 is moved out of the vehicle through the sensing unit 820. That is, the processor 870 may sense that the driver is getting off the vehicle.

The processor 870 may detect a distance d2 between the vehicle 100 and the shoe 900 through the sensing unit 820 when it is sensed through the sensing unit 820 that the shoe 900 is getting off the vehicle.

Figure 26:
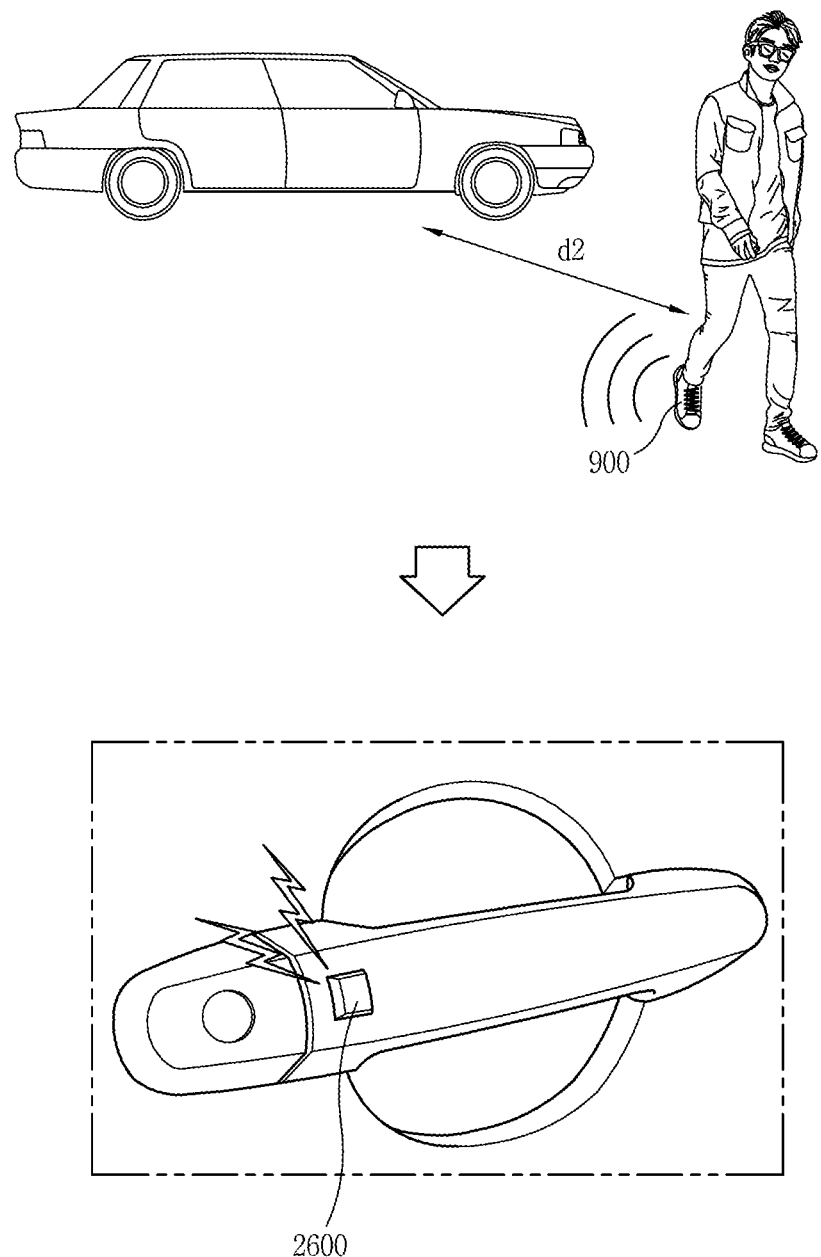

Thereafter, the processor 870 may lock a door of the vehicle, as illustrated in (b) of FIG. 26, when the distance d2 between the vehicle 100 and the shoe 900 is a predetermined distance or more.

On the other hand, the processor 870 may vary a tightened degree of the shoe depending on whether the shoe 900 is moved into the vehicle or moved out of the vehicle.

Figure 27:
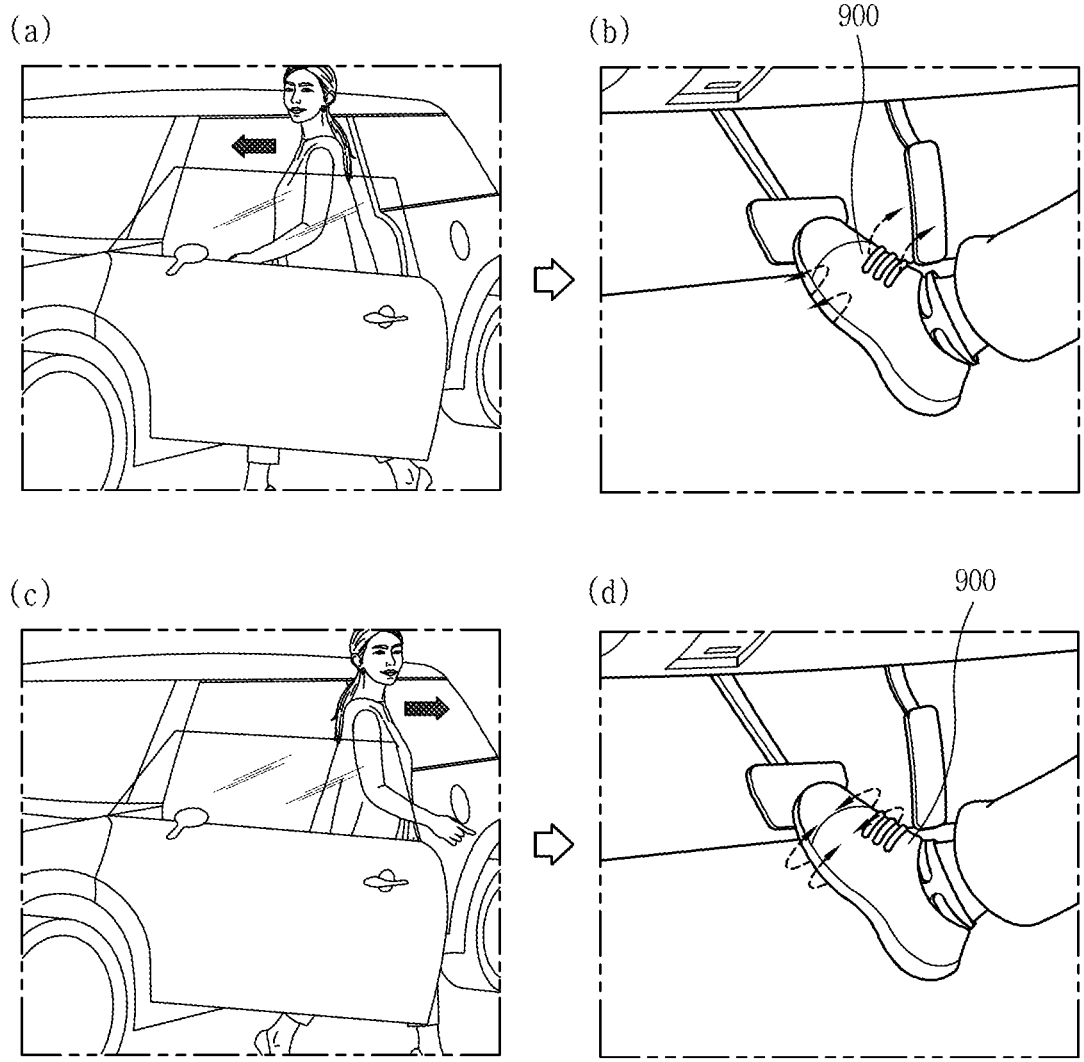

For example, as illustrated in (a) of FIG. 27, the processor 870 may sense that the shoe 900 enters from the outside to the inside of the vehicle through the sensing unit 820 (i.e., sense that the driver is boarding the vehicle).

In this case, the processor 870 may control the communication unit 810 (or the shoe 900) so that the shoelace is loosened, as illustrated in FIG. 27, to improve the driver's comfort.

On the other hand, as illustrated in (b) of FIG. 27, the processor 870 may detect that the shoe 900 is moved out of the vehicle (i.e., may detect that the driver is getting off the vehicle).

In this case, as illustrated in (d) of FIG. 27, the processor 870 may control the communication unit 810 (or the shoe 900) so that the shoelace is tightened to make the driver easily walk.

On the other hand, the shoe 900 of the present invention can measure a number of steps.

The processor 870 may receive a number of steps walked (counted) up to now within the day from the shoe 900.

The processor 870, as illustrated in (a) of FIG. 28, may output path information directed to a parking place that is spaced from a destination by a predetermined distance, so as to fully fill a target number of steps, when the number of steps received from the shoe 900 determines that the number of steps received from the shoe 900 is less than a target number of steps while the vehicle 100 still has a predetermined distance or less up to the destination.

In this case, as illustrated in (b) of FIG. 28, the driver may park the vehicle at the parking place spaced apart from the destination by the predetermined distance, and fill the target number of steps.

Meanwhile, the shoe 900 of the present invention may perform communication with a mobile terminal 2900. The shoe 900 may be controlled by the mobile terminal 2900 through communication with the mobile terminal 2900.

Figure 29:
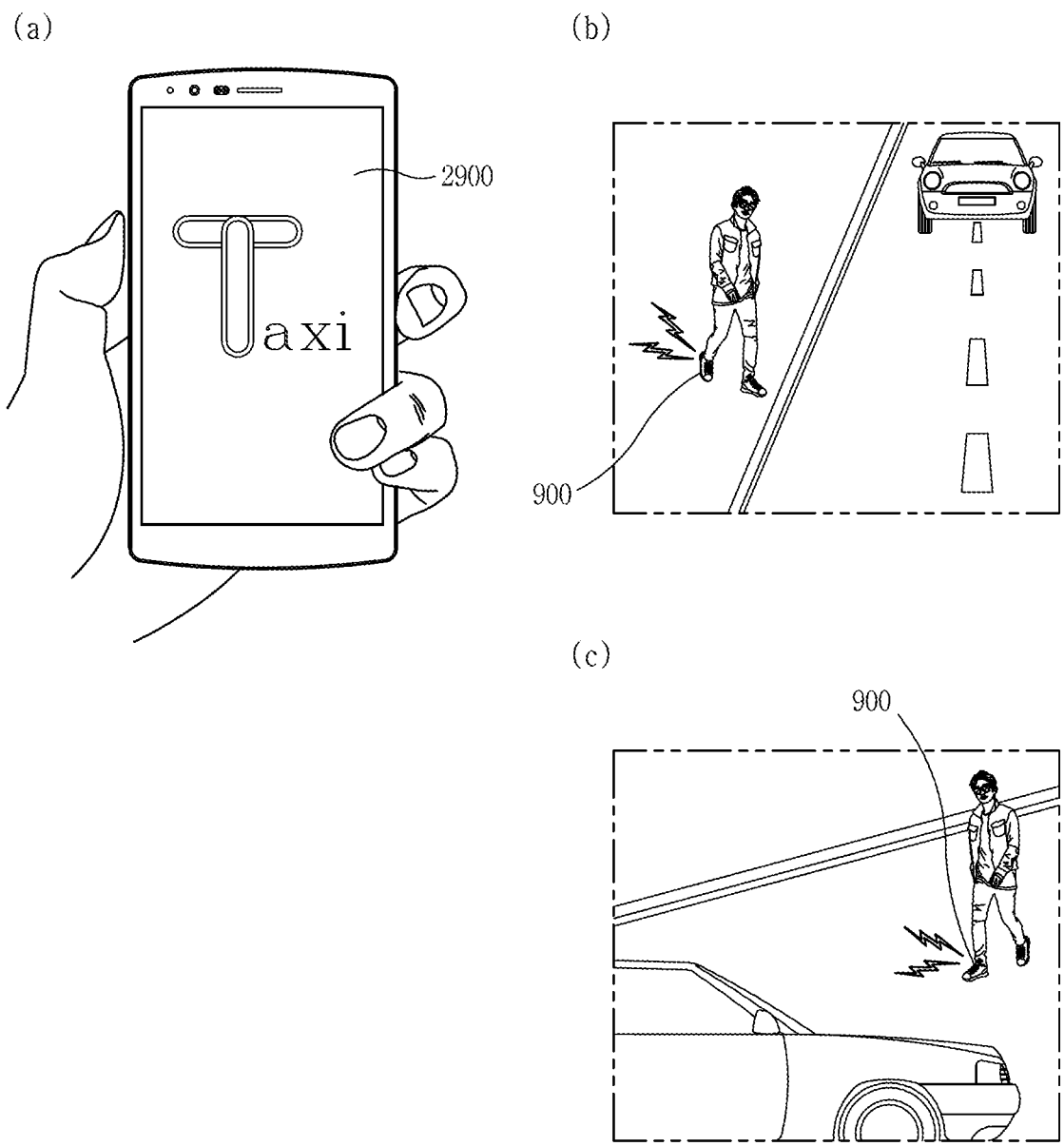
Figure 30:
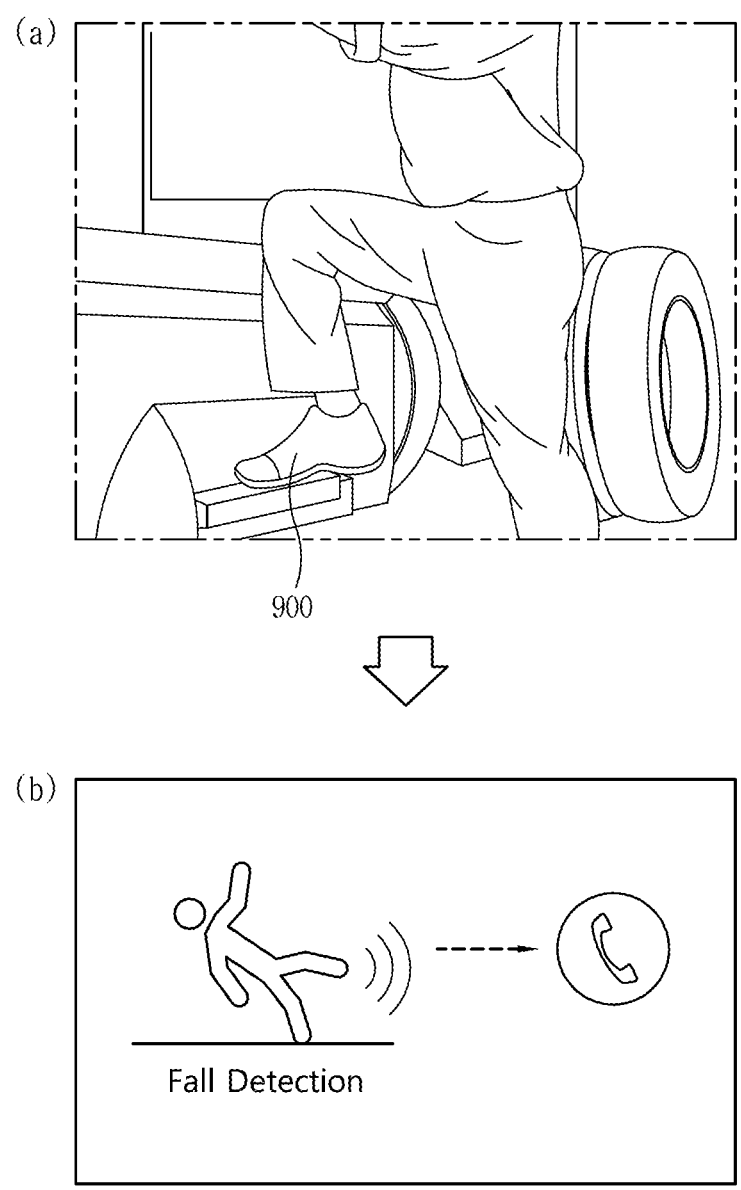

In the present invention, as illustrated in (a) of FIG. 29, when the mobile terminal 2900 places a call to a vehicle (e.g., a taxi, a carpooling vehicle, etc.), the processor 870 may output an alarm through the shoe 900.

For example, as illustrated in FIG. 29B, the shoe 900 may output an alarm when the vehicle, which has been called through the mobile terminal 2900 is within a predetermined distance from the mobile terminal (or the shoe).

Also, as illustrated in (c) of FIG. 29, the shoe 900 may output an alarm larger than the alarm when the vehicle, which has been called through the mobile terminal 2900, arrives at a called place. In addition, the shoe 900 may output an alarm through a different portion based on a direction in which the called vehicle approaches or a direction in which the called vehicle is located.

With this configuration, the present invention can provide a shoe capable of more easily recognize the access of the called vehicle through the shoe, and guiding more easily the direction that the called vehicle is approaching or the position where the called vehicle is located.

Meanwhile, the shoe 900 of the present invention may sense a movement of the shoe through the sensing unit 940. The controller 970 of the shoe 900 may transmit an emergency signal to the vehicle control device or the mobile terminal when the sensed movement of the shoe corresponds to a preset motion.

For example, the preset motion may be a motion that occurs when the driver falls while boarding on a vehicle (such as a lorry or a truck), namely, a motion that the shoe is lifted up to a predetermined height and then moved downward at a predetermined speed or more.

When the emergency signal is received from the shoe 900, the processor 870 of the vehicle control device or the mobile terminal informs an emergency situation to a preset emergency call number or transmits information related to the emergency situation to an external server.

In this specification, all operations/functions/controls performed in the processor 870 of the vehicle control device 800 may be performed by the controller 970 of the shoe 900.

For example, the controller 970 of the shoe 900 may receive at least one of information related to the vehicle or information related to the shoe from the vehicle control device 800 through the communication unit 910.

The controller 970 of the shoe 900 may sense (detect, determine, decide) a situation in which the vehicle is to be accelerated or decelerated, based on the received information related to the vehicle. In this case, the controller 970 of the shoe 900 may output an alarm through the alarm unit 920 based on the above situation and a position of the shoe.

Specifically, the controller 970 of the shoe 900 may decide the first situation in which the vehicle is to be accelerated or the second situation in which the vehicle is to be decelerated based on the information related to the vehicle.

Further, the controller 970 of the shoe 900 may sense the position of the shoe through the sensing unit 940 of the shoe.

The controller 970 of the shoe 900 may output an alarm through the alarm unit 930 when the shoe 900 is not positioned on the accelerator pedal in the first situation in which the vehicle is to be accelerated or when the shoe 900 is not positioned on the brake pedal in the second situation in which the vehicle is to be decelerated.

At this time, the controller 970 of the shoe 900 may output an alarm through the first alarm portion 921 when the vehicle is in the first situation to be accelerated, and output an alarm through the second alarm portion 922 when the vehicle is in the second situation to be decelerated.

The controller 970 of the shoe 900 may stop the output of the alarm when it is detected that the shoe is positioned on the accelerator pedal in the first situation or is positioned on the brake pedal in the second situation while the alarm is output.

In addition, the controller 970 of the shoe 900 may decide a degree that the accelerator pedal or the brake pedal is to be pressed for each of the first situation or the second situation. This may be decided based on information related to the vehicle received from the vehicle control device through the communication unit 910.

The controller 970 of the shoe 900 may output an additional alarm through the alarm unit 920 when the accelerator pedal or the brake pedal is pressed to a degree weaker than the decided degree.

In addition, the controller 970 of the shoe 900 may change a magnetism of the magnetic body 930 according to the first situation in which the vehicle is to be accelerated and the second situation in which the vehicle is to be decelerated.

For example, it is assumed that that an N pole is formed on the accelerator pedal and an S pole is formed on the brake pedal.

The controller 970 of the shoe 900 may allow the magnetic body 930 to have a magnetism (e.g., S pole) opposite to a magnetism (N pole) formed on the accelerator pedal, such that an attractive force is applied between the magnetic body 930 of the shoe 900 and the accelerator pedal, when the first situation in which the vehicle is to be accelerated is sensed. In this case, the shoe and the brake pedal may have the same magnetism (S pole) so as to be subjected to a repulsive force.

The controller 970 of the shoe 900 may allow the magnetic body 930 to have a magnetism (e.g., N pole) opposite to a magnetism (S pole) formed on the brake pedal such that an attractive force is applied between the magnetic body 930 of the shoe 900 and the brake pedal when the second situation in which the vehicle is to be decelerated is sensed. In this case, the shoe and the accelerator pedal may have the same magnetism (N pole), so as to be subjected to a repulsive force.

Also, when the brake pedal is being pressed but an acceleration of the vehicle is sensed, the controller 970 of the shoe 900 may receive driving information related to the vehicle from the vehicle control device, or transmit movement information related to the shoe to the vehicle control device or the mobile terminal.

In addition, the controller 970 of the shoe 900 of the present invention may perform all operations/functions/controls performed by the processor 870 of the vehicle control device 800 in the same/similar manner.

According to an embodiment of the present invention, one or more of the following effects can be provided.

First, the present invention can provide a new shoe which can help driving of the vehicle.

Second, the present invention can provide a system that can provide an alarm to a user in an optimized manner according to a state of the vehicle through a shoe.

Third, the present invention can provide a new user interface that can output an alarm to the user on the basis of a position of a shoe in a situation in which the vehicle is to be accelerated and a situation in which the vehicle is to be decelerated, so as to remarkably improve safety and convenience in driving the vehicle.

Fourth, the present invention can provide a new user interface that can control driving of a vehicle using a shoe in an autonomous driving mode.

The effects of the present invention are not limited to those effects mentioned above, and other effects not mentioned may be clearly understood by those skilled in the art from the description of the appended claims.

The vehicle control device 800 described above may be included in the vehicle 100.

The operation or control method of the vehicle control device 800 described above may be applied to an operation or control method of the vehicle 100 (or the control unit 170) in the same or similar manner.

For example, a method of controlling the vehicle 100 (or a method of controlling the vehicle control device 800) may include connecting the vehicle 100 to a shoe to perform communication with each other, sensing vehicle-related information and a position of the shoe, and outputting an alarm through the shoe based on a situation in which the vehicle is to be accelerated or decelerated and the position of the she when the situation is sensed.

The outputting may be configured to decide a first situation in which the vehicle is to be accelerated or a second situation in which the vehicle is to be decelerated based on the vehicle-related information, and output an alarm through the shoe when the shoe is not positioned on an accelerator pedal in the first situation or the shoe is not positioned on a brake pedal in the second situation.

More detailed embodiments will be replaced with the aforementioned description or applied in the same/like manner.

Each of the steps may be performed not only by the vehicle control device 800 but also by the controller 170 provided in the vehicle 100.

Further, all functions, configurations, or control methods performed by the vehicle control device 800 described above may be performed by the controller 170 provided in the vehicle 100. That is, all of the control methods described in this specification may be applied to a control method of a vehicle or a control method of a control device.

Further, all functions, configurations, or control methods performed by the vehicle control device 800 described above may be performed by a controller provided in the mobile terminal. In addition, all the control methods described in this specification can be applied to a method of controlling a mobile terminal in the same/like manner.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A control device for a vehicle, comprising:
 a communication unit configured to communicate with footwear;
 a sensing unit configured to sense vehicle-related information and a position of the footwear;
 at least one processor; and
 a computer-readable medium coupled to the at least one processor having stored thereon instructions which, when executed by the at least one processor, causes the at least one processor to perform operations comprising:
  determining, through the sensing unit, the position of the footwear;
  obtaining, through the sensing unit, the vehicle-related information;
  based on the vehicle-related information, determining a need to accelerate or decelerate the vehicle; and
  based on the position of the footwear and the determination of the need to accelerate or decelerate the vehicle, instructing the communication unit to output an alarm through an alarm unit of the footwear,
 wherein the determining the need to accelerate or decelerate the vehicle comprises:
  determining a situation of the vehicle by:
   determining the situation of the vehicle as a first situation based on a determination that the vehicle needs to be accelerated, or
   determining the situation of the vehicle as a second situation based on a determination that the vehicle needs to be decelerated,
 wherein the instructing the communication unit to output the alarm through the alarm unit of the footwear comprises:
  based on the position of the footwear and the determined situation of the vehicle, instructing the communication unit to output the alarm through the alarm unit of the footwear, and
 wherein the instructing the communication unit to output the alarm through the alarm unit of the footwear comprises:
  determining that (i) the vehicle is in the first situation and the footwear is not positioned on an accelerator pedal of the vehicle or (ii) the vehicle is in the second situation and the footwear is not positioned on a brake pedal of the vehicle; and
  based on the determination that (i) the vehicle is in the first situation and the footwear is not positioned on the accelerator pedal of the vehicle or (ii) the vehicle is in the second situation and the footwear is not positioned on the brake pedal of the vehicle, instructing the communication unit to output the alarm through the alarm unit of the footwear.

2. The device of claim 1, wherein the instructing the communication unit to output the alarm through the alarm unit of the footwear comprises:
 based on a determination that the vehicle is in the first situation, instructing the communication unit to output the alarm at a first alarm portion of the footwear; and based on a determination that the vehicle is in the second situation, instructing the communication unit to output the alarm at a second alarm portion of the footwear different from the first alarm portion.

3. The device of claim 1, wherein the operations comprise:
determining, while the alarm is being output through the alarm unit of the footwear, that (i) the vehicle is in the first situation and the footwear has moved to be positioned on the accelerator pedal of the vehicle or (ii) the vehicle is in the second situation and the footwear has moved to be positioned on the brake pedal of the vehicle; and
based on the determination that (i) the vehicle is in the first situation and the footwear has moved to be positioned on the accelerator pedal of the vehicle or (ii) the vehicle is in the second situation and the footwear has moved to be positioned on the brake pedal of the vehicle, instructing the communication unit to discontinue the alarm through the alarm unit of the footwear.

4. A vehicle comprising:
a plurality of wheels;
a power source configured to drive at least one of the plurality of wheels; and
the control device of claim 1.

5. A control device for a vehicle, comprising:
a communication unit configured to communicate with footwear;
a sensing unit configured to sense vehicle-related information and a position of the footwear;
at least one processor; and
a computer-readable medium coupled to the at least one processor having stored thereon instructions which, when executed by the at least one processor, causes the at least one processor to perform operations comprising:
determining, through the sensing unit, the position of the footwear;
obtaining, through the sensing unit, the vehicle-related information;
based on the vehicle-related information, determining a need to accelerate or decelerate the vehicle; and
based on the position of the footwear and the determination of the need to accelerate or decelerate the vehicle, instructing the communication unit to output an alarm through an alarm unit of the footwear,
wherein the determining the need to accelerate or decelerate the vehicle comprises:
determining a situation of the vehicle by:
determining the situation of the vehicle as a first situation based on a determination that the vehicle needs to be accelerated, or
determining the situation of the vehicle as a second situation based on a determination that the vehicle needs to be decelerated,
wherein the instructing the communication unit to output the alarm through the alarm unit of the footwear comprises:
based on the position of the footwear and the determined situation of the vehicle, instructing the communication unit to output the alarm through the alarm unit of the footwear, and
wherein the determining the need to accelerate or decelerate the vehicle comprises:
determining the first situation of the vehicle by:
detecting, through the sensing unit, a first signal associated with a traffic light; or determining that a current speed of the vehicle is lower than a minimum speed limit of a road currently traveled by the vehicle; and
based on (i) the detection of the first signal associated with the traffic light, or (ii) the determination that the current speed of the vehicle is lower than the minimum speed limit of a road currently traveled by the vehicle, determining the situation of the vehicle as the first situation, and
determining the second situation of the vehicle by:
detecting, through the sensing unit, a second signal associated with the traffic light; or
determining that a collision potential with another vehicle ahead is equal to or greater than a predetermined value; or
determining that a distance between an object around the vehicle and the vehicle is less than or equal to a predetermined distance; and
based on (i) the detection of the second signal associated with the traffic light, (ii) the determination that the collision potential with another vehicle ahead is equal to or greater than the predetermined value, or (iii) the determination that the distance between the object around the vehicle and the vehicle is less than or equal to the predetermined distance, determining the situation of the vehicle as the second situation.

6. A control device for a vehicle, comprising:
a communication unit configured to communicate with footwear;
a sensing unit configured to sense vehicle-related information and a position of the footwear;
at least one processor; and
a computer-readable medium coupled to the at least one processor having stored thereon instructions which, when executed by the at least one processor, causes the at least one processor to perform operations comprising:
determining, through the sensing unit, the position of the footwear;
obtaining, through the sensing unit, the vehicle-related information;
based on the vehicle-related information, determining a need to accelerate or decelerate the vehicle;
based on the position of the footwear and the determination of the need to accelerate or decelerate the vehicle, instructing the communication unit to output an alarm through an alarm unit of the footwear;
based on the vehicle-related information, determining a target depression level of an accelerator pedal or a brake pedal of the vehicle;
determining a current depression level of the accelerator pedal or the brake pedal;
determining that the current depression level is less than the target depression level of the accelerator pedal or the brake pedal; and
based on the determination that the current depression level is less than the target depression level, instructing the communication unit to output an additional alarm.

7. A control device for a vehicle, comprising:
a communication unit configured to communicate with footwear;
a sensing unit configured to sense vehicle-related information and a position of the footwear;
at least one processor; and
a computer-readable medium coupled to the at least one processor having stored thereon instructions which, when executed by the at least one processor, causes the at least one processor to perform operations comprising:
determining, through the sensing unit, the position of the footwear;
obtaining, through the sensing unit, the vehicle-related information;
based on the vehicle-related information, determining a need to accelerate or decelerate the vehicle; and
based on the position of the footwear and the determination of the need to accelerate or decelerate the vehicle, instructing the communication unit to output an alarm through an alarm unit of the footwear,
wherein the determining the need to accelerate or decelerate the vehicle comprises:
determining a situation of the vehicle by:
determining the situation of the vehicle as a first situation based on a determination that the vehicle needs to be accelerated, or
determining the situation of the vehicle as a second situation based on a determination that the vehicle needs to be decelerated,
wherein the instructing the communication unit to output the alarm through the alarm unit of the footwear comprises:
based on the position of the footwear and the determined situation of the vehicle, instructing the communication unit to output the alarm through the alarm unit of the footwear,
wherein:
the footwear comprises a magnetic body; and
the vehicle comprises an accelerator pedal and a brake pedal, the accelerator pedal and the brake pedal each configured to generate a variable magnetic field having variable polarity, and
wherein the operations comprise:
based on the determination that the vehicle is in the first situation, controlling the accelerator pedal to generate the variable magnetic field having a first polarity configured to attract the magnetic body of the footwear; and
based on the determination that the vehicle is in the second situation, controlling the brake pedal to generate the variable magnetic field having a second polarity configured to attract the magnetic body of the footwear.

8. A control device for a vehicle, comprising:
a communication unit configured to communicate with footwear;
a sensing unit configured to sense vehicle-related information and a position of the footwear;
at least one processor; and
a computer-readable medium coupled to the at least one processor having stored thereon instructions which, when executed by the at least one processor, causes the at least one processor to perform operations comprising:
determining, through the sensing unit, the position of the footwear;
obtaining, through the sensing unit, the vehicle-related information;
based on the vehicle-related information, determining a need to accelerate or decelerate the vehicle;
based on the position of the footwear and the determination of the need to accelerate or decelerate the vehicle, instructing the communication unit to output an alarm through an alarm unit of the footwear;
based on the position of the footwear, determining a pedal of the vehicle being pressed by the footwear;
determining a driving state of the vehicle; and
based on the determination of the pedal of the vehicle being pressed by the footwear and the driving state of the vehicle, performing a preset function.

9. The device of claim 8, wherein the operations comprise:
determining that a brake pedal of the vehicle is being pressed by the footwear;
based on the determination that the brake pedal of the vehicle is being pressed by the footwear, determining that the vehicle is accelerating while the brake pedal of the vehicle is being pressed by the footwear; and
based on the determination that the vehicle is accelerating while the brake pedal of the vehicle is being pressed by the footwear, transmitting, through the communication unit, the driving state to an external device.

10. The device of claim 8, wherein the operations comprise:
determining that a brake pedal of the vehicle is being pressed by the footwear;
based on the determination that the brake pedal of the vehicle is being pressed by the footwear, determining that the vehicle is accelerating while the brake pedal of the vehicle is being pressed by the footwear; and
based on the determination that the vehicle is accelerating while the brake pedal of the vehicle is being pressed by the footwear, performing one of:
turning off a power source of the vehicle; or
autonomously driving the vehicle to a preset location.

11. A control device for a vehicle, comprising:
a communication unit configured to communicate with footwear;
a sensing unit configured to sense vehicle-related information and a position of the footwear;
a footboard of a driver's seat of the vehicle comprising a first pad associated with an accelerator pedal of the vehicle and a second pad associated with a brake pedal of the vehicle,
at least one processor; and
a computer-readable medium coupled to the at least one processor having stored thereon instructions which, when executed by the at least one processor, causes the at least one processor to perform operations comprising:
determining, through the sensing unit, the position of the footwear;
obtaining, through the sensing unit, the vehicle-related information;
based on the vehicle-related information, determining a need to accelerate or decelerate the vehicle;
based on the position of the footwear and the determination of the need to accelerate or decelerate the vehicle, instructing the communication unit to output an alarm through an alarm unit of the footwear;
determining whether the first pad or the second pad is pressed;
based on the determination that the first pad is pressed, accelerating the vehicle; and
based on the determination that the second pad is pressed, decelerating the vehicle.

12. The device of claim 11, wherein the operations comprise:
determining whether the vehicle is in an autonomous driving mode or a manual driving mode;

based on the determination that the vehicle is in the autonomous driving mode, enabling the first and second pad; and based on the determination that the vehicle is in the manual driving mode, disabling the first and second pad.

13. A control device for a vehicle, comprising:
a communication unit configured to communicate with footwear;
a sensing unit configured to sense vehicle-related information and a position of the footwear;
at least one processor; and
a computer-readable medium coupled to the at least one processor having stored thereon instructions which, when executed by the at least one processor, causes the at least one processor to perform operations comprising:
determining, through the sensing unit, the position of the footwear;
obtaining, through the sensing unit, the vehicle-related information;
based on the vehicle-related information, determining a need to accelerate or decelerate the vehicle;
based on the position of the footwear and the determination of the need to accelerate or decelerate the vehicle, instructing the communication unit to output an alarm through an alarm unit of the footwear;
determining that the vehicle is in an autonomous driving mode;
based on the position of the footwear, determining whether the footwear is positioned on a first position adjacent to an accelerator pedal of the vehicle or a second position adjacent to a brake pedal of the vehicle;
based on the determination that the vehicle is in the autonomous driving mode and the footwear is positioned on the first position adjacent to the accelerator pedal, accelerating the vehicle; and
based on the determination that the vehicle is in the autonomous driving mode and the footwear is positioned on the second position adjacent to the brake pedal, decelerating the vehicle.

14. A control device for a vehicle, comprising:
a communication unit configured to communicate with footwear;
a sensing unit configured to sense vehicle-related information and a position of the footwear;
at least one processor; and
a computer-readable medium coupled to the at least one processor having stored thereon instructions which, when executed by the at least one processor, causes the at least one processor to perform operations comprising:
determining, through the sensing unit, the position of the footwear;
obtaining, through the sensing unit, the vehicle-related information;
based on the vehicle-related information, determining a need to accelerate or decelerate the vehicle;
based on the position of the footwear and the determination of the need to accelerate or decelerate the vehicle, instructing the communication unit to output an alarm through an alarm unit of the footwear;
determining that the vehicle is in an autonomous driving mode;
determining whether a first portion of the footwear or a second portion of the footwear different from the first portion is in contact with a footboard of a driver's seat of the vehicle;
based on the determination that the vehicle is in the autonomous driving mode and the first portion of the footwear is in contact with the footboard of the drivers seat of the vehicle, accelerating the vehicle; and
based on the determination that the vehicle is in the autonomous driving mode and the second portion of the footwear is in contact with the footboard of the driver's seat of the vehicle, decelerating the vehicle.

15. The device of claim 14, wherein the operations comprise:
determining an area of the first or second portion of the footwear in contact with the footboard of the driver's seat of the vehicle; or
determining a pressure exerted by the footwear in contact with the footboard of the driver's seat of the vehicle; and
accelerating or decelerating the vehicle in correspondence to the determined area or pressure.

16. A method for controlling a vehicle, the method comprising:
establishing, through a communication unit of the vehicle, a communication channel between the vehicle and a footwear;
determining, through a sensing unit, a position of the footwear;
obtaining, through the sensing unit, vehicle-related information;
based on the vehicle-related information, determining a need to accelerate or decelerate the vehicle; and
based on the determined position of the footwear and the determination of the need to accelerate or decelerate the vehicle, instructing the communication unit to output an alarm through an alarm unit of the footwear,
wherein the determining the need to accelerate or decelerate the vehicle comprises:
determining a situation of the vehicle by:
determining the situation of the vehicle as a first situation based on a determination that the vehicle needs to be accelerated, or
determining the situation of the vehicle as a second situation based on a determination that the vehicle needs to be decelerated, and
wherein the instructing the communication unit to output the alarm through the alarm unit of the footwear comprises:
based on the position of the footwear and the determined situation of the vehicle, instructing the communication unit to output the alarm through the alarm unit of the footwear.

17. The method of claim 16, wherein the determining the need to accelerate or decelerate the vehicle comprises:
determining the first situation of the vehicle by:
detecting, through the sensing unit, a first signal associated with a traffic light; or
determining that a current speed of the vehicle is lower than a minimum speed limit of a road currently traveled by the vehicle; and
based on (i) the detection of the first signal associated with the traffic light, or (ii) the determination that the current speed of the vehicle is lower than the minimum speed limit of a road currently traveled by the vehicle, determining that the vehicle needs to be accelerated, and
determining the second situation of the vehicle by:

detecting, through the sensing unit, a second signal associated with the traffic light; or determining that a collision potential with another vehicle ahead is equal to or greater than a predetermined value; or determining that a distance between an object around the vehicle and the vehicle is less than or equal to a predetermined distance; and based on (i) the detection of the second signal associated with the traffic light, (ii) the determination that the collision potential with another vehicle ahead is equal to or greater than the predetermined value, or (iii) the determination that the distance between the object around the vehicle and the vehicle is less than or equal to the predetermined distance, determining that the vehicle needs to be decelerated.

\* \* \* \* \*